US011971966B2

(12) United States Patent
Nishida

(10) Patent No.: US 11,971,966 B2
(45) Date of Patent: Apr. 30, 2024

(54) INFORMATION PROCESSING METHOD, INFORMATION PROCESSING APPARATUS, INFORMATION PROCESSING SYSTEM, AND RECORDING MEDIUM

(71) Applicant: Takayori Nishida, Kanagawa (JP)

(72) Inventor: Takayori Nishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 220 days.

(21) Appl. No.: 17/389,343

(22) Filed: Jul. 30, 2021

(65) Prior Publication Data
US 2022/0035894 A1 Feb. 3, 2022

(30) Foreign Application Priority Data
Aug. 3, 2020 (JP) .................. 2020-131999

(51) Int. Cl.
G06F 21/31 (2013.01)
(52) U.S. Cl.
CPC .................... G06F 21/31 (2013.01)
(58) Field of Classification Search
CPC ....................................... G06F 21/31
See application file for complete search history.

(56) References Cited

U.S. PATENT DOCUMENTS 6,961,587 B1 * 11/2005 Vilppula ............... H04W 8/183
455/410
7,428,750 B1 * 9/2008 Dunn ..................... G06F 21/41
726/8
9,286,482 B1 * 3/2016 Dumont ................ G06F 21/32
9,923,927 B1 * 3/2018 McClintock ........ H04L 63/0846
10,666,834 B2 5/2020 Nishida
10,832,357 B1 * 11/2020 Pagliano ............ G06Q 30/0611
10,997,617 B2 5/2021 Nishida
2014/0122349 A1 6/2014 Takatsu et al.
2014/0373105 A1 12/2014 Hu et al.
2015/0149358 A1 * 5/2015 Robbin .................. G06Q 50/01
705/35

(Continued)

FOREIGN PATENT DOCUMENTS

EP 3 324 661 A1 5/2018
EP 3324661 A1 * 5/2018 ............ H04L 63/10

(Continued)

OTHER PUBLICATIONS

Extended European Search Report dated Dec. 9, 2021 in European Patent Application No. 21188340.0, 7 pages.

(Continued)

Primary Examiner — James R Turchen
(74) Attorney, Agent, or Firm — XSENSUS LLP

(57) ABSTRACT

An information processing method includes: activating a linkage function from a service of a linkage source to a service of a linkage destination, in response to determining that both of the service of the linkage source and the service of the linkage destination are usable by the contract user; and deactivating use of the linkage function for a login user managed by the contract user, in response to determining that the login user does not have use-permission for using the service of the linkage destination.

8 Claims, 25 Drawing Sheets

(56) References Cited

U.S. PATENT DOCUMENTS

| | | | |
|---|---|---|---|
| 2015/0347996 A1* | 12/2015 | Alsina | G06Q 20/29 |
| | | | 726/28 |
| 2015/0350221 A1* | 12/2015 | Espinosa | G06F 21/6245 |
| | | | 726/4 |
| 2016/0019375 A1* | 1/2016 | Fasoli | G06F 21/10 |
| | | | 726/30 |
| 2017/0026545 A1* | 1/2017 | Mori | H04N 1/344 |
| 2017/0199861 A1* | 7/2017 | Zia | G06F 3/04842 |
| 2020/0220993 A1 | 7/2020 | Nishida | |
| 2021/0107768 A1 | 4/2021 | Nishida | |
| 2021/0192022 A1* | 6/2021 | Chen | G06F 21/31 |
| 2021/0266734 A1* | 8/2021 | Kapinos | G06V 40/197 |
| 2021/0271662 A1* | 9/2021 | Muse | G16H 50/70 |
| 2022/0245229 A1* | 8/2022 | Zhang | G06F 1/1647 |

FOREIGN PATENT DOCUMENTS

| | | |
|---|---|---|
| JP | 2018-092670 | 6/2018 |
| JP | 2018-142122 A | 9/2018 |

OTHER PUBLICATIONS

Office Action issued Dec. 12, 2023 in Japanese Patent Application No. 2020-131999, 2 pages. (with 2 pages of English Translation).

* cited by examiner

FIG.8

| CONTRACT INFORMATION ID | CONTRACT USER ID | SERVICE ID | ACTIVATED/ DEACTIVATED |
|---|---|---|---|
| 1 | Company 1 | Service A | ACTIVATED |
| 2 | Company 1 | Service B | ACTIVATED |
| 3 | Company 1 | Service C | ACTIVATED |
| 4 | Company 2 | Service A | ACTIVATED |
| 5 | Company 2 | Service B | ACTIVATED |
| 6 | Company 2 | Service C | DEACTIVATED |
| 7 | Company 3 | Service A | ACTIVATED |
| 8 | Company 3 | Service B | DEACTIVATED |
| 9 | Company 3 | Service C | ACTIVATED |

FIG.9

| LINKAGE DEFINITION INFORMATION ID | LINKAGE SOURCE SERVICE ID | LINKAGE DESTINATION SERVICE ID |
|---|---|---|
| 1 | Service A | Service B |
| 2 | Service A | Service C |
| 3 | Service B | Service A |

FIG.10

| PRIVILEGE INFORMATION ID | USER ID | CONTRACT USER ID | Service A admin | Service A user | Service B admin | Service B user | Service C admin | Service C user |
|---|---|---|---|---|---|---|---|---|
| 1 | User 1 | Company 1 | TRUE | TRUE | TRUE | TRUE | TRUE | TRUE |
| 2 | User 2 | Company 1 | FALSE | TRUE | FALSE | TRUE | FALSE | TRUE |
| 3 | User 3 | Company 1 | FALSE | TRUE | FALSE | FALSE | FALSE | TRUE |
| 4 | User 4 | Company 2 | TRUE | TRUE | TRUE | TRUE | NULL | NULL |

| LINKAGE USAGE ID | CONTRACT USER ID | LINKAGE DEFINITION INFORMATION ID |
|---|---|---|
| 1 | Company 1 | 1 |
| 2 | Company 1 | 3 |
| 3 | Company 2 | 1 |
| 4 | Company 3 | 2 |

FIG.15

All Applications    Clear All

FILTERS
- ▼ Managing
  - ☐ Deployed — 1301
  - ☑ Not Deployed — 1302
  - ☐ Need Update
- ▼ Pricing
  - ☐ Free
  - ☐ Paid 🔍    ↻ Find in Store    | Request Plugin | — 1300

379 results    Sort by [A-Z ▼]

Filterd by [Not Installed ✕]

Service B    [Install] — 1303
Description:
This service provides Print service.

Service D    [Install] — 1303
Description:
xxxxxxxxxxxxxxxxxxxxxxxxxxxx
xxxxxxxxxxxxxxxxxxxxxxxxxxxx

Service E    [Install] — 1303
Description:
xxxxxxxxxxxxxxxxxxxxxxxxxxxx
xxxxxxxxxxxxxxxxxxxxxxxxxxxx

FIG. 20

| Services B | |
|---|---|
| *Name | Services B |
| Version | 1.0.0 |
| Install date | 2018/09/01 |
| Short description | This service provides the document workflow service. |

Related Links
Manage Developers
Switch to this Application
Uninstall

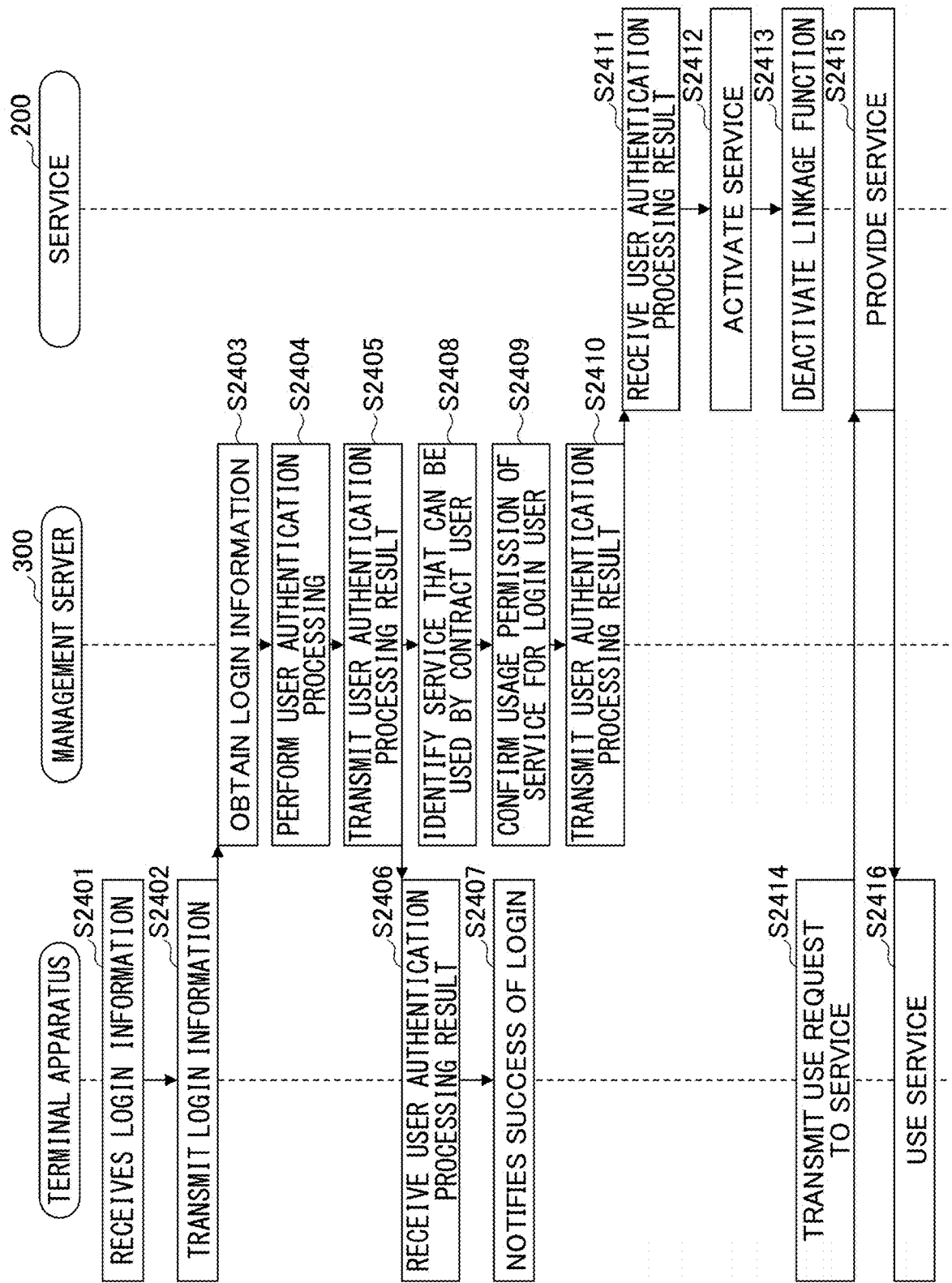

INFORMATION PROCESSING METHOD, INFORMATION PROCESSING APPARATUS, INFORMATION PROCESSING SYSTEM, AND RECORDING MEDIUM

CROSS-REFERENCE TO RELATED APPLICATION

The present application is based on and claims priority under 35 U.S.C. § 119 to Japanese Patent Application No. 2020-131999, filed on Aug. 3, 2020, the content of which is incorporated herein by reference in its entirety.

BACKGROUND OF THE INVENTION

1. Field of the Invention

An embodiment of the present disclosure relates to an information processing method, an information processing apparatus, an information processing system, and a recording medium.

2. Description of the Related Art

Japanese Patent No. 645188 discloses a technique relating to a service-providing system providing multiple services, wherein a user logs in to the service-providing system by using login information including an organization identification number (ID), so that the user can use the deployed available services associated with the organization ID.

SUMMARY OF THE INVENTION

According to an aspect of an embodiment of the present disclosure, an information processing method includes: activating a linkage function from a service of a linkage source to a service of a linkage destination, in response to determining that both of the service of the linkage source and the service of the linkage destination are usable by the contract user; and deactivating use of the linkage function for a login user managed by the contract user, in response to determining that the login user does not have use-permission for using the service of the linkage destination.

BRIEF DESCRIPTION OF THE DRAWINGS

FIG. 8 is a drawing illustrating a specific example of a deployment information database (DB) according to the embodiment of the present invention;

FIG. 9 is a drawing illustrating a specific example of a linkage definition information database according to the embodiment of the present invention;

FIG. 10 is a drawing illustrating a specific example of a user privilege information database according to the embodiment of the present invention;

FIG. 11 is a drawing illustrating a specific example of a linkage-use information database according to the embodiment of the present invention;

FIG. 15 is a drawing illustrating an example of a display screen that is displayed on the management terminal according to the embodiment of the present invention when an additional deployment of a service is performed;

FIG. 20 is a drawing illustrating an example of a display screen that is displayed on the management terminal according to the embodiment of the present invention when a deployment of a service is cancelled;

FIG. 26 is a sequence diagram illustrating a procedure of user authentication processing performed by the information processing system according to the embodiment of the present invention.

DESCRIPTION OF THE EMBODIMENTS

Japanese Patent No. 645188 discloses a technique relating to a service-providing system providing multiple services, wherein a user logs in to the service-providing system by using login information including an organization identification number (ID), so that the user can use the deployed available services associated with the organization ID.

In a case where a login user uses a service and there is another service that can be linked to that service, it is desired o appropriately control the use of a linkage function by the login user to the another service.

Hereinafter, an embodiment of the present invention is described with reference to the drawings.

(Overview of Integrated Service-Providing System 20)

Figure 1:
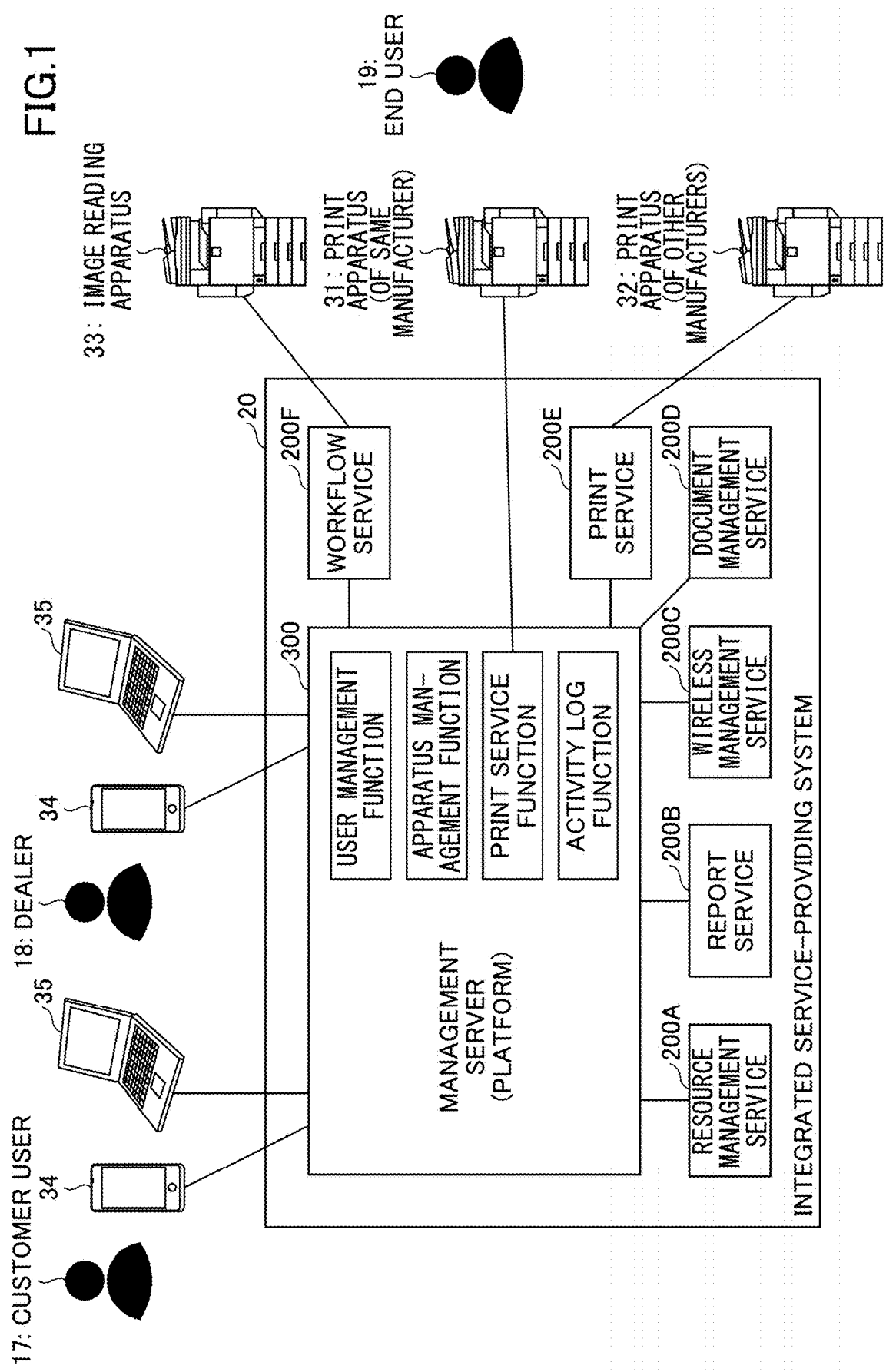
FIG. 1 is a drawing illustrating an overview of an integrated service-providing system of an embodiment of the present invention.

First, an overview of the integrated service-providing system 20 according to the embodiment of the present invention is explained with reference to FIG. 1. FIG. 1 is a drawing illustrating the overview of the integrated service-providing system 20 according to the embodiment of the present invention.

The integrated service-providing system 20 as illustrated in FIG. 1 allows a user to perform management of all kinds of people and things in an office (for example, users, devices, documents, conference rooms, and the like) by using multiple services 200 in an integrated manner.

As illustrated in FIG. 1, the integrated service-providing system 20 includes, as examples of the multiple services 200, a resource management service 200A, a report service 200B, a wireless management service 200C, a document management service 200D, a print service 200E, and a workflow service 200F.

Also, the integrated service-providing system 20 includes a management server 300. The management server 300 is similar to management servers 300 explained with reference to FIG. 2 and subsequent drawings, and functions as a platform for integrally managing the multiple services 200A to 200F. For example, as illustrated in FIG. 1, the management server 300 includes a user management function, an apparatus management function, a print service function, an activity log function, and the like. For example, the print service function is a function for providing an end user 19 (an example of "a contract user") with a print function for performing printing with a print apparatus 31 (for example, an MFP, a printer, and the like), manufactured by the same manufacturer as the integrated service-providing system 20, managed by the management server 300. For example, the activity log function is a function for obtaining logs of the number of printed sheets and the number of scanned sheets by apparatuses and obtaining a log of the number of contracts of a dealer 18 (a sales agent). A customer user 17 and the dealer 18 can use the management function, of which use-permissions are given to the customer user 17 and the dealer 18, from among multiple management functions provided in the management server 300 by accessing the management server 300 with any given terminal apparatus (for example, a smartphone 34, a personal computer (PC) 35, and the like as illustrated in FIG. 1).

The resource management service 200A provides a resource management function for managing resources (for example, interactive whiteboards, conference rooms, and the like) in the office. For example, the end user 19 can manage reservations of conference rooms amongst other things by using the resource management service 200A.

The report service 200B provides a generation function and an output function of reports. The wireless management service 200C provides a wireless apparatus management function for managing various kinds of wireless apparatuses.

The document management service 200D provides the end user 19 with a document management function for managing multiple documents. The print service 200E provides the end user 19 with a print function for printing by a print apparatus 32 (an MFP, a printer, and the like), manufactured by third parties, connected to the print service 200E.

The workflow service 200F provides the end user 19 with a generation function and an execution function of workflows. For example, according to the workflow provided by the workflow service 200F, a scanner function of an image reading apparatus 33 (for example, an MFP and the like) performs optical character recognition (OCR) of formed images, so that the recognition result thereof can be saved in a predetermined folder. For example, according to the workflow provided by the workflow service 200F, the review and approval process of any given documents in the office can be performed.

These multiple services 200A to 200F include a service with a function of linking with another service 200 (for example, a linkage function of the workflow service 200F for linking with the print service 200E). Also, the end user 19 can deploy and use only a desired service 200 or desired services 200 from among the multiple services 200A to 200F. Therefore, as explained specifically with reference to FIG. 2 and subsequent drawings, the management server 300 has a function (hereinafter referred to as an "activation and deactivation function") for activating and deactivating the linkage functions of the respective services 200, according to contract situations (i.e., deployment situations) of the services 200 by the end user 19.

Hereinafter, Application Examples 1 to 8 of the activation and deactivation function in the integrated service-providing system 20 as illustrated in FIG. 1 are explained.

Application Example 1

The activation and deactivation function is applied to the linkage between the resource management service 200A and the report service 200B. For example, situations of use of conference rooms (for example, a utilization rate, the number of people who used a conference room, and the like) managed by the resource management service 200A may be output as a report. In this case, on the setting screen of the report service 200B, as a choice for which report output target data is to be obtained (examples of "graphical user interface (GUI) components"), conference rooms managed by the resource management service 200A are displayed (activated) or hidden (deactivated) according to whether the end user 19 has a contract for (i.e., has deployed) the resource management service 200A and whether the end user 19 has use-permission thereof.

Application Example 2

The activation and deactivation function is applied to linkage between the wireless management service 200C and the report service 200B. For example, a state of concentration of accesses to a particular wireless LAN device may be output as a report. In this case, on the setting screen of the report service 200B, as a choice for which report output target data is to be obtained (an example of a "GUI component"), the wireless apparatuses managed by the wireless management service 200C are displayed (activated) or hidden (deactivated) according to whether the end user 19 has a contract for (i.e., has deployed) the wireless management service 200C and whether the end user 19 has use-permission thereof.

Application Example 3

The activation and deactivation function is applied to a linkage between the document management service 200D and the print service 200E. For example, print requests may be periodically transmitted from the document management service 200D to the print service 200E, for example, documents managed by the document management service 200D are periodically printed. In this case, on the setting screen of the document management service 200D, as a choice to which print requests are output (an example of a "GUI component"), the print service 200E is displayed (activated) or hidden (deactivated) according to whether the end user 19 has a contract for (i.e., has deployed) the print service 200E and whether the end user 19 has use-permission thereof.

Application Example 4

The activation and deactivation function is applied to a linkage between the print service 200E and the report service 200B. For example, the number of printed sheets managed by the print service 200E may be periodically counted and output as a report. In this case, on the setting screen of the report service 200B, as a choice for which report output target data is to be obtained (an example of a "GUI component"), the print service 200E is displayed (activated) or hidden (deactivated) according to whether the end user 19 has a contract for (i.e., has deployed) the print service 200E and whether the end user 19 has use-permission thereof.

Application Example 5

The activation and deactivation function is applied to a linkage between the workflow service 200F and the report service 200B. For example, the number of executions, success and failure results, and the like managed by the workflow service 200F may be counted and output as a report. In this case, on the setting screen of the report service 200B, as a choice for which report output target data is to be obtained (an example of a "GUI component"), the workflow service 200F is displayed (activated) or hidden (deactivated) according to whether the end user 19 has a contract for (i.e., has deployed) the workflow service 200F and whether the end user 19 has use-permission thereof.

Application Example 6

The activation and deactivation function is applied to a linkage between the workflow service 200F and the document management service 200D. For example, as an execution result of the workflow service 200F, Portable Document Format (PDF) files and form information may be saved in the document management service 200D. In this case, on the setting screen of the workflow service 200F, as a choice of a destination in which save-target data is to be saved (an example of a "GUI component"), the document management service 200D is displayed (activated) or hidden (deactivated) according to whether the end user 19 has a contract for (i.e., has deployed) the document management service 200D and whether the end user 19 has use-permission thereof.

Application Example 7

The activation and deactivation function is applied to a linkage between the resource management service 200A and the print service 200E that performs printing. For example, by selecting (e.g., clicking or touching) a linkage button with the print service 200E displayed on an interactive whiteboard managed by the resource service, data displayed on the interactive whiteboard may be printed by a print apparatus that can be used by the print service 200E. In this case, on the interactive whiteboard, the linkage button with the print service 200E is displayed (activated) or hidden (deactivated), on the basis of the control of the resource service, according to whether the end user 19 has a contract for (i.e., has deployed) the print service 200E and whether the end user 19 has use-permission thereof.

Application Example 8

The activation and deactivation function is applied to a linkage between the resource management service 200A and the workflow service 200F. For example, by selecting a linkage button with the workflow service 200F displayed on an interactive whiteboard managed by the resource service, data displayed on the interactive whiteboard may be put into a workflow (specifically, a workflow for review and approval) of the workflow service 200F. In this case, on the interactive whiteboard, a linkage button with the workflow service 200F (for example, a "review request" button illustrated in FIG. 25) is displayed (activated) or hidden (deactivated), on the basis of the control of the resource service, according to whether the end user 19 has a contract for (i.e., has deployed) the workflow service 200F and whether the end user 19 has use-permission thereof.

Hereinafter, with reference to FIG. 2 to FIG. 26, an information processing system 10 capable of implementing the integrated service-providing system 20 as illustrated in FIG. 1 is specifically explained.

(Configuration of Information Processing System 10)

Figure 2:
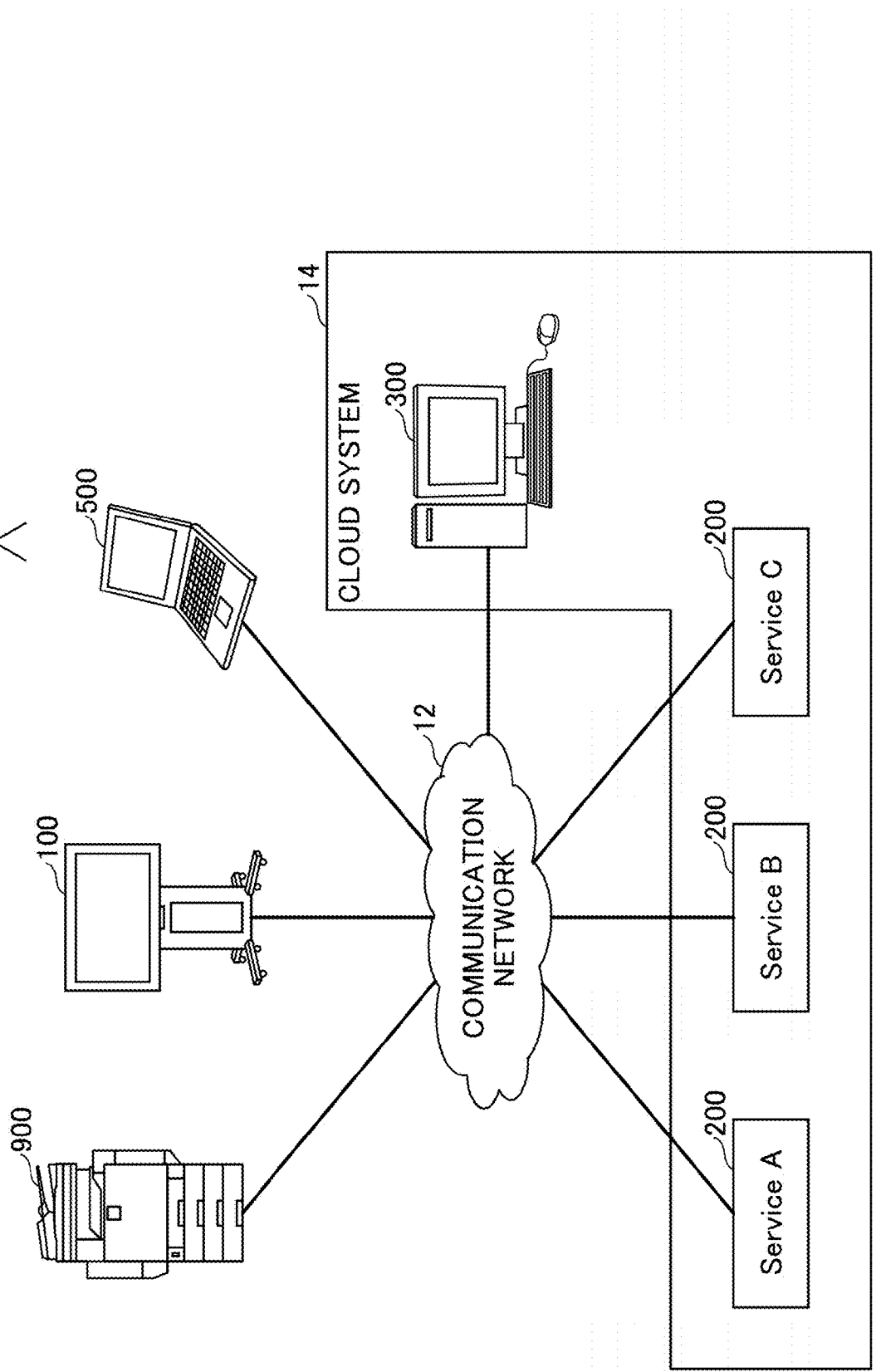
FIG. 2 is a drawing illustrating a configuration of an information processing system according to an embodiment of the present invention.

FIG. 2 is a drawing illustrating a configuration of the information processing system 10 according to an embodiment of the present invention. As illustrated in FIG. 2, the information processing system 10 according to the present embodiment includes an interactive whiteboard (IWB) 100, an MFP (multifunction peripheral, product, or printer) 900, multiple services 200, a management server 300, and a management terminal 500, all of which are configured to be able to communicate with one another via a communication network 12.

The multiple services 200 are provided in a cloud system 14. The multiple services 200 are provided via the communication network 12 to multiple terminal apparatuses including the interactive whiteboard 100 and the MFP 900, so that the multiple services 200 can be used by the multiple terminal apparatuses including the interactive whiteboard 100 and the MFP 900. For example, the multiple services 200 include various services such as a print service, a document management service, a workflow service, a deployment management service, and the like. The multiple services 200 include not only services 200 provided by the company that provides the management server 300 (i.e., the company that is mainly in charge of the management of the multiple services 200) but also services 200 provided by third-party companies other than the company that provides the management server 300.

The interactive whiteboard 100 is an apparatus that is used by participants and the like who participate in a conference held in a conference room and the like in an office. For example, the interactive whiteboard 100 can display images, and the participants can write annotations and the like on the images. Also, the interactive whiteboard 100 can use the multiple services 200 provided by the cloud system 14 (for example, a print service, a document management service, a workflow service, and the like) via the communication network 12. For example, by using the print service, the interactive whiteboard 100 can cause a print apparatus connected to the print service to print images displayed on a display unit 180 (see FIG. 3). Also, for example, by using the document management service, the interactive whiteboard 100 can save, onto a file server and the like, an image file displayed on the display unit 180. For example, by using the workflow service, the interactive whiteboard 100 can execute a workflow using an image file representing an image displayed on the display unit 180.

The MFP 900 is an apparatus that is used by employees and the like in an office and the like. For example, the MFP 900 includes a scanner function, a printer function, a copy function, a document box function, a facsimile function, and the like. Also, the MFP 900 can use the multiple services 200 provided by the cloud system 14 (for example, a print service, a document management service, a workflow service, and the like) via the communication network 12. For example, by using the print service, the MFP 900 can cause the print apparatus connected to the print service to print an image read by a scanner function. Also, for example, by using the document management service, the MFP 900 can save, onto a file server and the like, an image file formed by reading an image with the scanner function. Also, for example, by using the workflow service, the MFP 900 can execute a workflow using the image file formed by reading an image with the scanner function.

In the present embodiment, the interactive whiteboard 100 and the MFP 900 are used as examples of "terminal apparatuses" capable of using the multiple services 200. However, the "terminal apparatuses" are not limited thereto. Alternatively, a personal computer (PC), a tablet terminal, a smartphone, a video conference terminal, a camera, a scanner, a projector, a hand-held printer, and the like may be used as the "terminal apparatuses" capable of using the multiple services 200.

The management server 300 is an example of an "information processing apparatus". The management server 300 is provided in the cloud system 14. The management server 300 functions as a platform for managing the multiple services 200 in an integrated manner. For example, the management server 300 can perform various kinds of management of the service 200, such as management of the contract users who manages the services 200, management of the services 200, deployment management of the services 200, and the like. For example, the management server 300 manages the login information, the deployment information, and the like for each of the contract users of the service 200. Therefore, with the interactive whiteboard 100, the MFP 900, or other terminal apparatuses, the contract user can log in to the cloud system 14 by using the login information of the user, and can use a service 200 which the user has deployed from among the multiple services 200 provided by the cloud system 14.

In the integrated service-providing system 20, "the contract user" means a user who is given permission (for a new deployment, deployment cancellation, or the like) that is to be given to the user who has contracts of services. Also, "the contract users" are not limited to be in units of individual persons, and may be in units of organizations, in units of companies, or in units of groups to which multiple individual persons belong. Also, in a case where "the contract users" are in units of individual persons, such users may be administrators. Also, the "login user" means a user who can use a service provided by the integrated service-providing system 20 by logging in to the service with a user ID and a password. In the integrated service-providing system 20, for each service which "the contract user" has deployed, the administrator of the service manages and gives use-permissions to one or more "login users".

The management terminal 500 is a terminal apparatus used by a deployment manager 16 (an example of "a related person of a contract user", the deployment manager 16 is, for example, a dealer 18 as illustrated in FIG. 1) who manages the deployment. In the present embodiment, a PC is used as the management terminal 500, but the management terminal 500 may be other terminal apparatuses. For example, the management terminal 500 is used by the deployment manager 16 when a new deployment, an additional deployment, or deployment cancellation is performed for a service 200 with respect to a particular contract user. For example, by logging in to the management server 300 from the management terminal 500, the deployment manager 16 can perform, for a particular service 200, a new deployment (i.e., activation of the service 200), an additional deployment (i.e., activation of the service 200), and deployment cancellation (i.e., deactivation of the service 200) with respect to the particular contract user.

(Hardware Configuration of Interactive Whiteboard 100)

Figure 3:
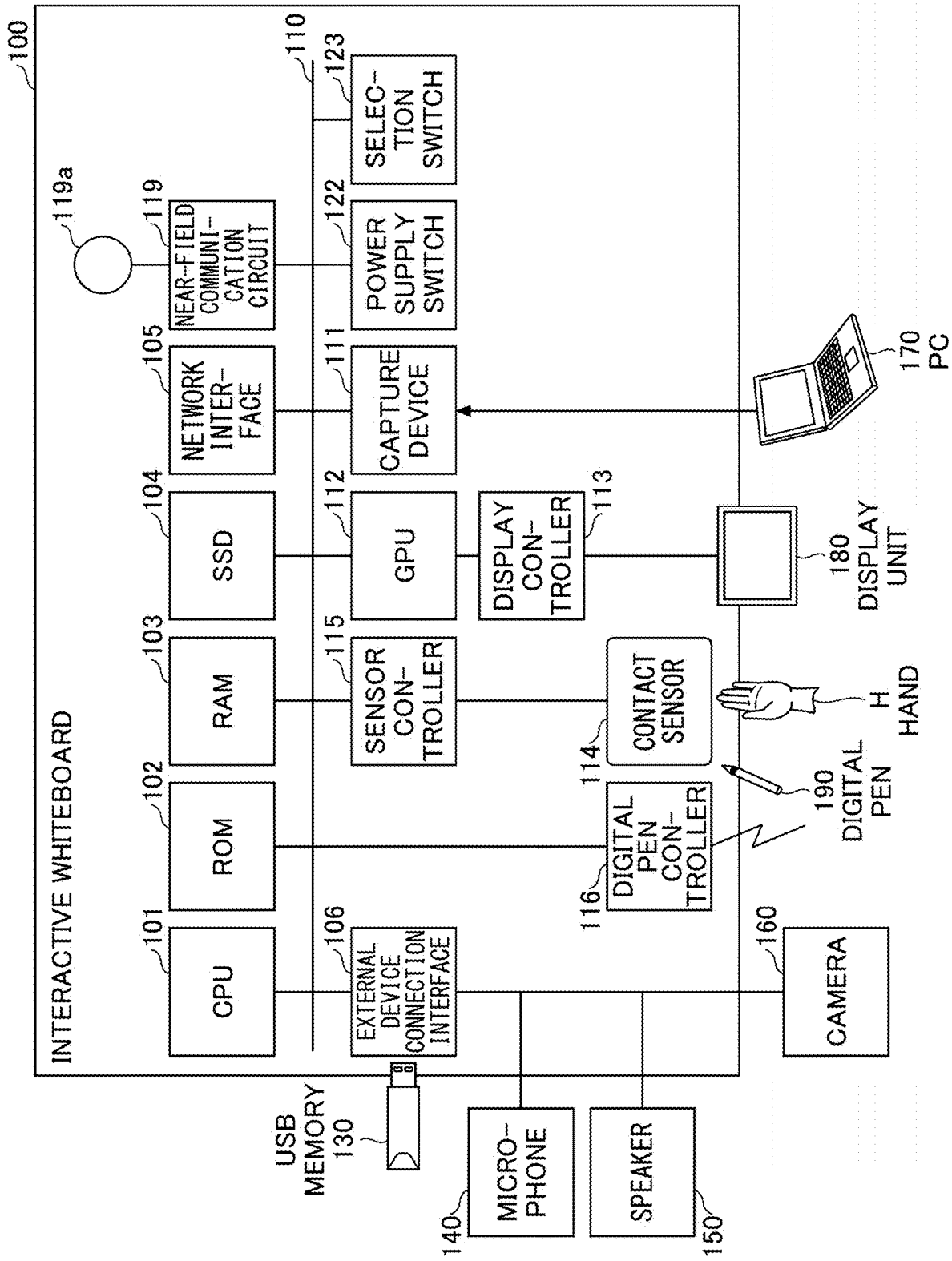
FIG. 3 is a hardware configuration diagram of an interactive whiteboard.

FIG. 3 is a hardware configuration diagram of the interactive whiteboard 100. As illustrated in FIG. 3, the interactive whiteboard 100 includes a central processing unit (CPU) 101, a read only memory (ROM) 102, a random access memory (RAM) 103, a solid state drive (SSD) 104, a network interface (I/F) 105, and an external device connection interface 106.

Among them, the CPU 101 controls the overall operation of the interactive whiteboard 100. The ROM 102 stores programs used for driving the CPU 101, such as an initial program loader (IPL). The RAM 103 is used as a work area for the CPU 101. The SSD 104 stores various kinds of data such as programs for the interactive whiteboard 100. The network interface 105 controls communication with the communication network 12. The external device connection interface 106 is an interface for connecting various kinds of external devices. In this case, the external device is, for example, a universal serial bus (USB) memory 130, and external devices (a microphone 140, a speaker 150, and a camera 160).

In addition, the interactive whiteboard 100 includes a capture device 111, a graphics processing unit (GPU) 112, a display controller 113, a contact sensor 114, a sensor controller 115, a digital pen controller 116, a near-field communication circuit 119, an antenna 119a of the near-field communication circuit 119, a power supply switch 122, and a selection switch 123.

Among them, the capture device 111 displays video information, as a still picture or a moving picture, on the display of an external personal computer (PC) 170. The GPU 112 is a semiconductor chip dedicated to graphics processing. The display controller 113 controls and manages displaying of output images from the GPU 112 to display the output images on the display unit 180 and the like. The contact sensor 114 detects a digital pen 190, a hand H of the user, and the like coming into contact with the display unit 180. The sensor controller 115 controls processing of the contact sensor 114. The contact sensor 114 detects, by an infrared blocking method, the coordinates of the digital pen 190, the hand H of the user, and the like coming into contact with the display unit 180. In the infrared blocking method, two light emission and reception devices provided on both end portions of the upper side of the display unit 180 emit multiple infrared rays in parallel with the display unit 180, the emitted infrared rays are reflected by reflection members provided on the periphery of the display unit 180, and the light reception devices receive the infrared rays returning back to the light reception devices along the same optical paths as the optical paths of the emitted infrared rays. The contact sensor 114 outputs, to the sensor controller 115, an identification (ID) number of an infrared ray blocked by an object from among the infrared rays emitted by the two light emission and reception devices, and the sensor controller 115 identifies the coordinate position, i.e., the contact position of the object, on the basis of the ID number. The digital pen controller 116 communicates with the digital pen 190 to determine a contact with the display unit 180 by a tip or a rear (opposite) side to the tip of the digital pen 190. The near-field communication circuit 119 is a communication circuit of near-field communication (NFC), Bluetooth (registered trademark), and the like. The power supply switch 122 is a switch for selecting the ON/OFF state of the power supply of the interactive whiteboard 100. For example, the selection switch 123 is a group of switches for adjusting the brightness, color, and the like of displaying of the display unit 180.

Furthermore, the interactive whiteboard 100 includes a bus line 110. The bus line 110 is, for example, an address bus, a data bus, and the like for electrically connecting constituent elements such as the CPU 101 as illustrated in FIG. 3.

The contact sensor 114 is not limited to an infrared blocking method, and may use various detection means such as a capacitive touch panel that identifies the contact position by detecting a change in capacitance, a resistor film type touch panel that identifies the contact position by detecting a voltage change between two opposing resistor films, an electromagnetic induction touch panel that identifies the contact position by detecting electromagnetic induction caused by an object coming into contact with the display unit, and the like. The digital pen controller 116 may determine not only a contact by the tip or the rear (opposite) side to the tip of the digital pen 190 but also user's touch of a portion of the digital pen 190 grasped by the user and user's touch of other portions of the digital pen 190.

(Hardware Configuration of MFP 900)

Figure 4:
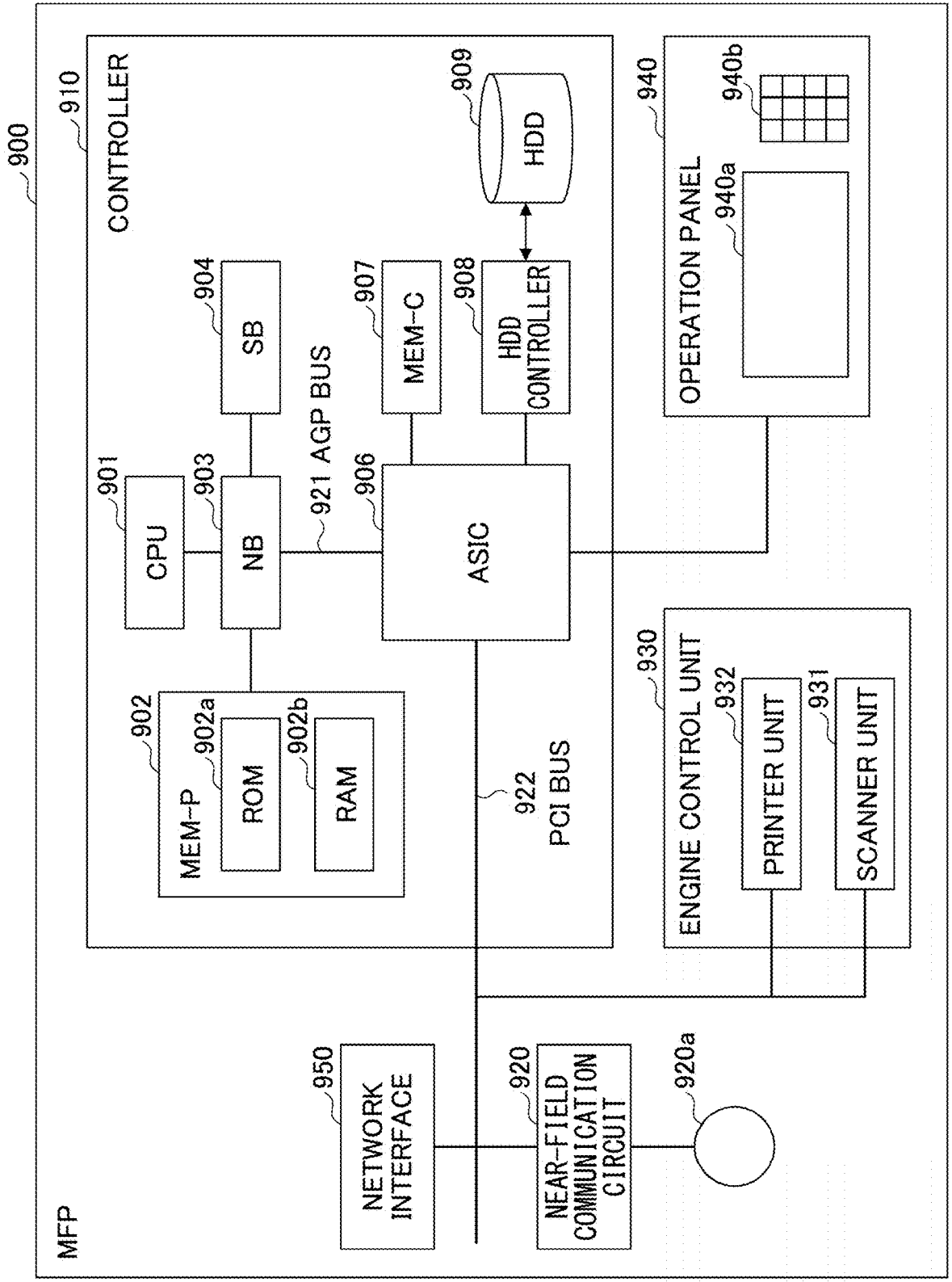
FIG. 4 is a hardware configuration diagram of an MFP (multifunction peripheral, product, or printer)

FIG. 4 is a hardware configuration diagram of the MFP 900. As illustrated in FIG. 4, the MFP 900 includes a controller 910, a near-field communication circuit 920, an engine control unit 930, an operation panel 940, and a network interface 950.

Among them, the controller 910 includes a CPU 901, a system memory (MEM-P) 902, a north bridge (NB) 903, a south bridge (SB) 904, an application specific integrated circuit (ASIC) 906, a local memory (MEM-C) 907 that is a storage unit, a hard disk drive (HDD) controller 908, and a hard disk drive (HDD) 909 that is a storage unit, all of which are main components of the computer, and is configured such that an accelerated graphics port (AGP) bus 921 connects the NB 903 and the ASIC 906.

Among them, the CPU 901 is a control unit that controls the entirety of the MFP 900. The NB 903 is a bridge for connecting the CPU 901, the MEM-P 902, the SB 904, and the AGP bus 921. The NB 903 includes a memory controller for controlling reading and writing of the MEM-P 902, and also includes a peripheral component interconnect (PCI) master and an AGP target.

The MEM-P 902 includes a ROM 902a and a RAM 902b. The ROM 902a is a memory for storing programs and data for implementing the functions of the controller 910. The RAM 902b is used as a memory to which programs and data are extracted and as a rendering memory during memory printing. The programs stored in the RAM 902b may be provided in a form of an installable or executable file recorded on a computer-readable recording medium such as a CD-ROM, a CD-R, or a DVD.

The SB 904 is a bridge for connecting the NB 903 to PCI devices and peripheral devices. The ASIC 906 is an integrated circuit (IC) for image processing that has hardware elements for image processing, and serves as a bridge that connects the AGP bus 921, the PCI bus 922, the HDD controller 908, and the MEM-C 907. The ASIC 906 includes the PCI master, the AGP target, an arbiter (ARB) that forms the core of the ASIC 906, a memory controller that controls the MEM-C 907, and a plurality of DMACs (Direct Memory Access Controllers) that rotate image data using hardware logic and the like, and also includes a PCI unit that performs data transfer between a scanner unit 931 and a printer unit 932 via the PCI bus 922. The ASIC 906 may be connected to a universal serial bus (USB) interface or an IEEE 1394 (Institute of Electrical and Electronics Engineers 1394) interface.

The MEM-C 907 is a memory used as an image buffer for copying and as a code buffer. The HDD 909 is a storage for storing image data, storing font data used for printing, and storing forms. The HDD controller 908 controls reading or writing of data from or to the HDD 909 according to the control of the CPU 901. The AGP bus 921 is a bus interface for a graphics accelerator card that has been proposed to speed up graphics processing. The AGP bus 921 can accelerate the graphics accelerator card by directly accessing the MEM-P 902 at a high throughput.

The near-field communication circuit 920 includes an antenna 920a. The near-field communication circuit 920 is a communication circuit such as NFC (Near Field Communication) and Bluetooth (registered trademark).

Further, the engine control unit 930 includes a scanner unit 931 and a printer unit 932. The operation panel 940 includes a panel display unit 940a and an operation panel 940b. The panel display unit 940a is, for example, a touch panel and the like for displaying current setting values, a selection screen, and the like, and receiving an input from a user. The operation panel 940b includes, for example, numeric keys for receiving setting values of conditions for image forming such as a setting condition of a density, a start key for receiving a copy start instruction, and the like. The controller 910 controls the entirety of the MFP 900 and controls, for example, rendering, communication, input from the operation panel 940, and the like. The scanner unit 931 or the printer unit 932 includes image processing portions for error diffusion, gamma conversion, and the like.

In response to an operation of an application switching key of the operation panel 940, the MFP 900 can sequentially switch and select a document box function, a copy function, a printer function, and a facsimile function. The document box mode is set when the document box function is selected, the copy mode is set when the copy function is selected, the printer mode is set when the printer function is selected, and the facsimile mode is set when the facsimile mode is selected.

The network interface 950 is an interface for performing data communication using the communication network 12. The near-field communication circuit 920 and the network interface 950 are electrically connected to the ASIC 906 via the PCI bus 922.

(Hardware Configuration of Management Server 300)

Figure 5:
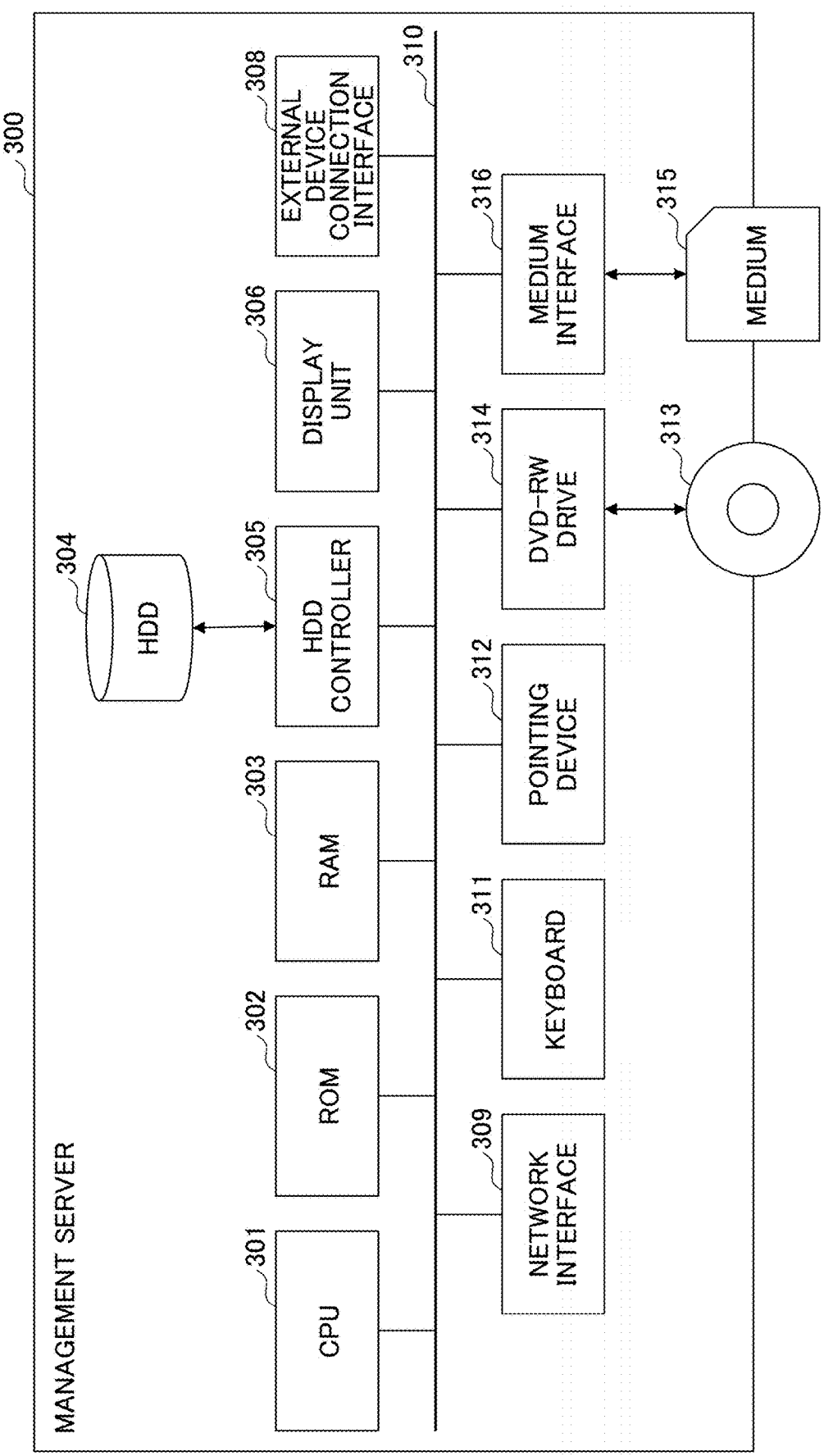
FIG. 5 is a hardware configuration diagram of a management server.

FIG. 5 is a hardware configuration diagram of the management server 300. As illustrated in FIG. 5, the management server 300 is constituted by a computer, and as illustrated in FIG. 5, the management server 300 includes a CPU 301, a ROM 302, a RAM 303, an HDD 304, an HDD controller 305, a display unit 306, an external device connection interface 308, a network interface 309, a bus line 310, a keyboard 311, a pointing device 312, a DVD-RW (Digital Versatile Disk Rewritable) drive 314, and a medium interface 316.

Among them, the CPU 301 controls the overall operation of the management server 300. The ROM 302 stores programs used for driving the CPU 301, such as an IPL. The RAM 303 is used as a work area for the CPU 301. The HDD 304 stores various kinds of data such as programs. The HDD controller 305 controls reading or writing of various kinds of data from or to the HDD 304 according to the control of the CPU 301. The display unit 306 displays various kinds of information such as a cursor, menus, windows, characters, or images. The external device connection interface 308 is an interface for connecting various kinds of external devices. In this case, the external device is, for example, a universal serial bus (USB) memory, a printer, and the like. The network interface 309 is an interface for performing data communication using the communication network 12. The bus line 310 is, for example, an address bus, a data bus, and the like for electrically connecting constituent elements such as the CPU 301 as illustrated in FIG. 5.

The keyboard 311 is a type of input means having a plurality of keys for inputting characters, numerical values, various instructions, and the like. The pointing device 312 is a type of input means for selecting and executing various instructions, selecting a processing target, moving a cursor, and the like. The DVD-RW drive 314 controls reading or writing of various kinds of data from or to a DVD-RW 313 as an example of a removable recording medium. It should be noted that the removable recording medium is not limited to the DVD-RW, and may be a DVD-R or the like. The medium interface 316 controls reading or writing (storing) of data from or to a recording medium 315 such as a flash memory.

(Hardware Configuration of Management Terminal 500)

Figure 6:
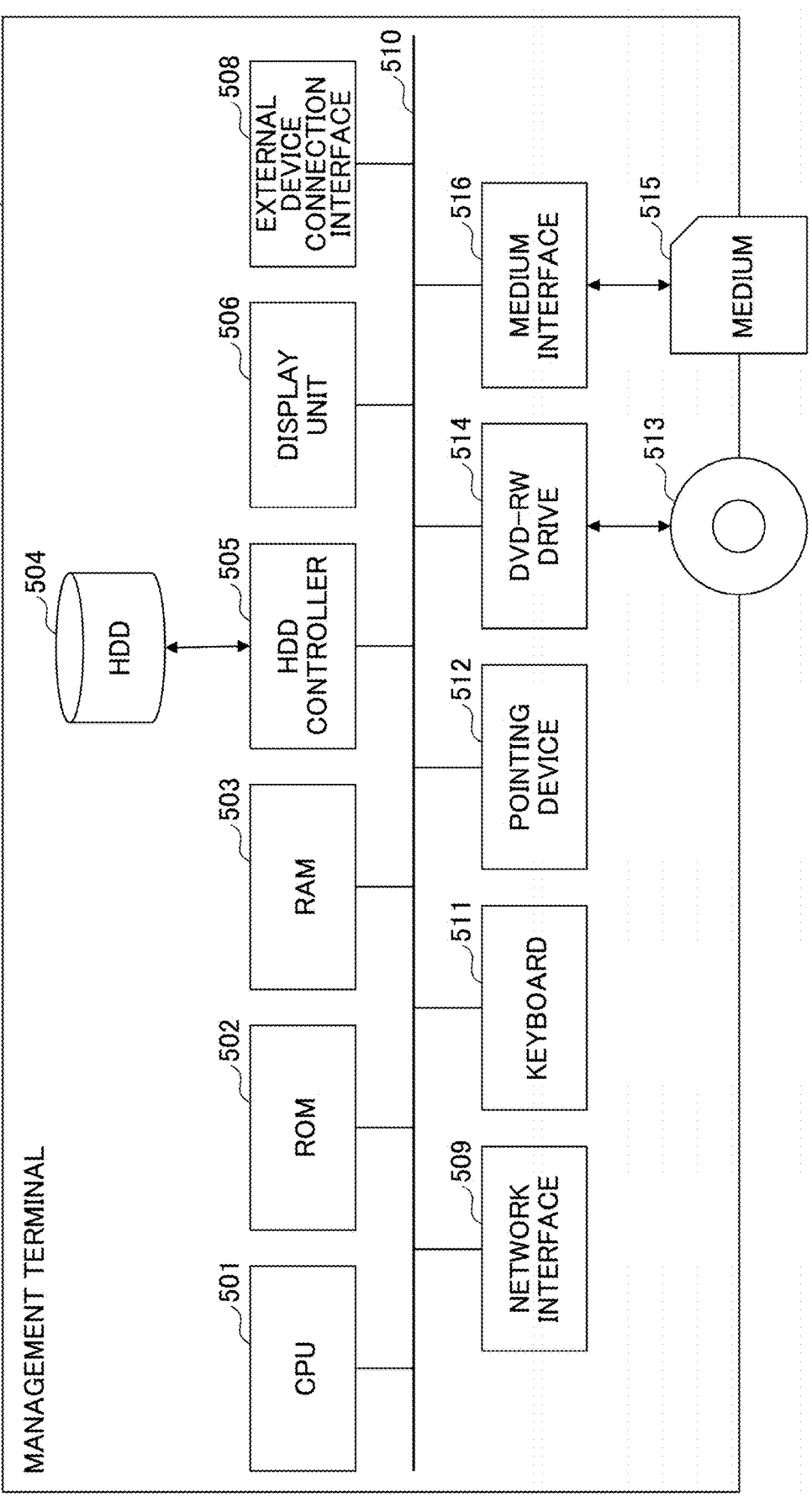
FIG. 6 is a hardware configuration diagram of a management terminal.

FIG. 6 is a hardware configuration diagram of the management terminal 500. As illustrated in FIG. 6, the management terminal 500 is constituted by a computer, and as illustrated in FIG. 6, the management terminal 500 includes a CPU 501, a ROM 502, a RAM 503, an HDD 504, an HDD controller 505, a display unit 506, an external device connection interface 508, a network interface 509, a bus line 510, a keyboard 511, a pointing device 512, a DVD-RW drive 514, and a medium interface 516.

Among them, the CPU 501 controls the overall operation of the management terminal 500. The ROM 502 stores programs used for driving the CPU 301, such as an IPL. The RAM 503 is used as a work area for the CPU 501. The HDD 504 stores various kinds of data such as programs. The HDD controller 505 controls reading or writing of various kinds of data from or to the HDD 504 according to the control of the CPU 501. The display unit 506 displays various kinds of information such as a cursor, menus, windows, characters, or images. The external device connection interface 508 is an interface for connecting various kinds of external devices. In this case, the external device is, for example, a universal serial bus (USB) memory and a printer. The network interface 509 is an interface for performing data communication using the communication network 12. The bus line 510 is, for example, an address bus, a data bus, and the like for electrically connecting constituent elements such as the CPU 501 as illustrated in FIG. 6.

The keyboard 511 is a type of input means having a plurality of keys for inputting characters, numerical values, various instructions, and the like. The pointing device 512 is a type of input means for selecting and executing various instructions, selecting a processing target, moving a cursor, and the like. The DVD-RW drive 514 controls reading or writing of various kinds of data from or to a DVD-RW 513 as an example of a removable recording medium. It should be noted that the removable recording medium is not limited to the DVD-RW, and may be a DVD-R or the like. The medium interface 516 controls reading or writing (storing) of data from or to a recording medium 515 such as a flash memory.

(Functional Configuration of Management Server 300)

Figure 7:
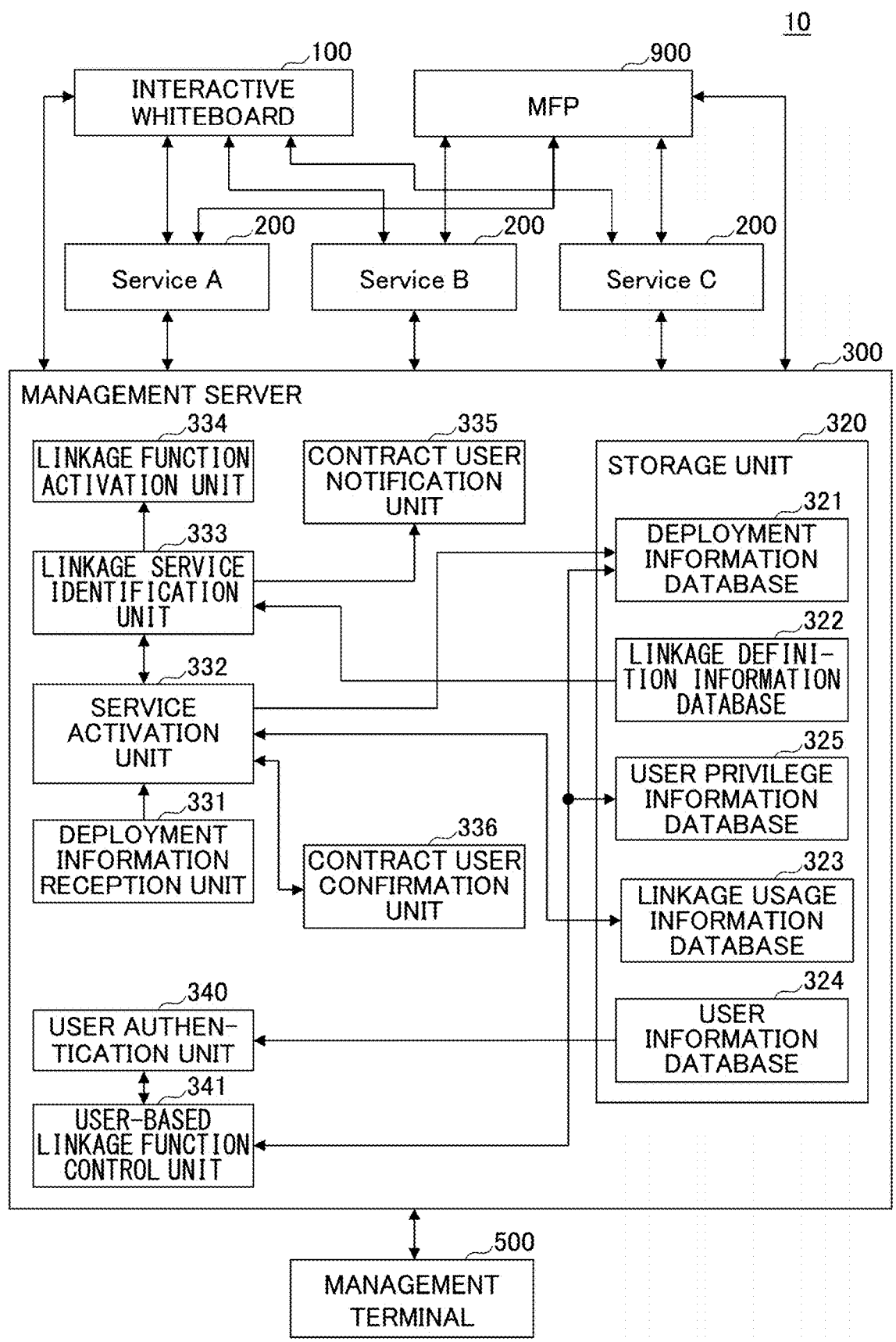
FIG. 7 is a drawing illustrating a functional configuration of the management server according to the embodiment of the present invention.

FIG. 7 is a drawing illustrating a functional configuration of the management server 300 according to an embodiment of the present invention. As illustrated in FIG. 7, the management server 300 includes a storage unit 320, a deployment information reception unit 331, a service activation unit 332, a linkage service identification unit 333, a linkage function activation unit 334, a contract user notification unit 335, a contract user confirmation unit 336, a user authentication unit 340, and a user-based linkage function control unit 341.

The storage unit 320 stores various kinds of databases. More specifically, the storage unit 320 includes a deployment information database 321, a linkage definition information database 322, a linkage-use information database 323, a user information database 324, and a user privilege information database 325. The deployment information database 321 stores, for each of the contract users, deployment information as to which service the contract user has deployed (i.e., which service the contract user can use). The linkage definition information database 322 stores, for each of the services, linkage definition information indicating which service the service is linked to. The linkage-use information database 323 stores, for each of the contract users, linkage-use information indicating which linked service the contract user is actually using. The user information database 324 stores user information for each of the login users. The user information includes at least a user ID and a password required for user authentication processing. The user privilege information database 325 stores, for each of the login users, information about use-permission of each service (for example, as to whether the login user is given a user privilege, as to whether the login user is given an administrator privilege). Specific examples of the deployment information database 321, the linkage definition information database 322, the linkage-use information database 323, and the user privilege information database 325 are explained with reference to FIG. 8 to FIG. 12.

The deployment information reception unit 331 receives deployment information of services transmitted from the management terminal 500. For example, the deployment information reception unit 331 receives deployment information about a new deployment, deployment information about an additional deployment, or deployment information about deployment cancellation.

The deployment information about a new deployment is transmitted from the management terminal 500 when the deployment manager 16 uses the management terminal 500 to perform a new deployment of a service 200 for a particular contract user, and includes at least a contract user identification number (ID) of the contract user who performs the new deployment and a service identification number (ID) of the service 200 of which the new deployment has been performed.

The deployment information about an additional deployment is transmitted from the management terminal 500, when the deployment manager 16 uses the management terminal 500 to perform an additional deployment of a service 200 for a particular contract user, and includes at least a contract user identification number (ID) of the contract user for whom the additional deployment is performed and the service ID of the service 200 of which the additional deployment is performed.

The deployment information about deployment cancellation is transmitted from the management terminal 500 when the deployment manager 16 uses the management terminal 500 to perform deployment cancelation of a service 200 for a particular contract user, and includes at least a contract user ID of the contract user for whom the deployment cancelation is performed and the service ID of the service 200 of which the deployment cancellation is performed.

The service activation unit 332 activates or deactivates the service 200 on the basis of deployment information received by the deployment information reception unit 331.

For example, in a case where the deployment information reception unit 331 receives the deployment information about a new deployment, the service activation unit 332 sets "activated" in the deployment information database 321 with respect to a combination of the contract user ID of the contract user for whom the new deployment is performed and the service ID of the service 200 of which the new deployment has been performed indicated in the deployment information. As a result, the service 200 of which the new deployment has been performed is activated.

Also, for example, in a case where the deployment information reception unit 331 receives deployment information about an additional deployment, the service activation unit 332 sets "activated" in the deployment information database 321 with respect to a combination of the contract user ID of the contract user for whom the additional deployment is performed and the service ID of the service 200 for whom the additional deployment is performed indicated in the deployment information. As a result, the service 200 of which the additional deployment is performed is activated.

For example, in a case where the deployment information reception unit 331 receives the deployment information about deployment cancellation, the service activation unit 332 sets "deactivated" in the deployment information database 321 with respect to a combination of the contract user ID of the contract user for whom the deployment cancellation is performed and the service ID of the service 200 for whom the deployment cancellation is performed indicated in the deployment information. As a result, the service 200 of which the deployment cancellation is performed is deactivated.

In a case where the service activation unit 332 activates or deactivates the service 200, the linkage service identification unit 333 identifies another service 200 linked to the activated or deactivated service 200 on the basis of the linkage definition information database 322.

In a case where the linkage service identification unit 333 identifies another service 200 linked to the activated service 200, the linkage function activation unit 334 notifies the service 200 of the linkage source, from among the activated service 200 and the another service 200 identified by the linkage service identification unit 333, to activate the linkage function for linking with the service 200 of the linkage destination. For example, in response to this notification, the service 200 of the linkage source activates a GUI component (for example, a selection button) indicating the linkage function for linking with the service 200 of the linkage destination.

In a case where the linkage service identification unit 333 identifies another service 200 linked with a deactivated service 200, the linkage function activation unit 334 notifies, of the another service 200, that the another service 200 is to deactivate the linkage function with the deactivated service 200. For example, in response to this notification, the another service 200 deactivates a GUI component (for example, a selection button) indicating the linkage function for linking with the deactivated service 200.

In a case where the contract user performs an additional deployment for a service 200, and accordingly another service 200 (a service 200 of linkage source) is enabled to link with and use the added service 200 (the service 200 of the linkage destination), the contract user notification unit 335 notifies of the contract user, who has performed the additional deployment, that the service 200 of the linkage destination can be used from the service 200 of the linkage source. For example, this notification is achieved by transmitting a message to the terminal apparatus used by the contract user who has performed the additional deployment.

In a case where the contract user performs deployment cancellation for a service 200, and accordingly another service 200 (a service 200 of linkage source) is disabled from linking with and using the service 200 of which the deployment has been cancelled (the service 200 of the linkage destination), the contract user confirmation unit 336 confirms with the contract user as to whether the contract user agrees to deactivate the service 200 of which the deployment cancellation has been performed. For example, this confirmation is achieved by transmitting a message to the terminal apparatus used by the contract user who has performed the deployment cancellation.

The user authentication unit 340 obtains login information from various kinds of terminal apparatuses used by the login user, and performs authentication processing of the login user on the basis of the login information. More specifically, in a case where a combination of the user ID and the password included in the login information transmitted from various kinds of terminal apparatuses matches a combination of the user ID and the password stored in the user information database 324 in advance, the user authentication unit 340 determines that the result of the authentication processing of the login user is "successful". In this case, for example, the user authentication unit 340 notifies, of a user authentication processing result, that the authentication processing of the login user has been successfully completed, to the service 200 that has been deployed by the contract user, to whom the login user who has performed the login processing belongs. In addition, the user authentication unit 340 also notifies, of the user authentication processing result, that the authentication processing of the login user has been successfully completed, to the login user who has performed the login processing. As a result, with various kinds of terminal apparatuses, the login user who has performed the login processing can use the service that has been deployed by the contract user, to whom the login user belongs. Conversely, in a case where a combination of the user ID and the password included in the login information transmitted from various kinds of terminal apparatuses does not match a combination of the user ID and the password stored in the user information database 324 in advance, the user authentication unit 340 determines that the result of the authentication processing of the login user is "failure". In this case, for example, the user authentication unit 340 notifies, of a user authentication processing result, that the authentication processing of the login user has failed, to the login user who has performed the login processing.

The functions of the embodiment described above can be implemented by one or a plurality of processing circuits. In this case, the "processing circuit" in this specification is considered to include a processor programmed to execute the functions by software, such as a processor implemented by an electronic circuit, and devices designed to execute the functions described above, such as an ASIC (Application Specific Integrated Circuit), a DSP (Digital Signal Processor), an FPGA (Field Programmable Gate Array), and conventional circuit modules.

The user-based linkage function control unit 341 controls activation and deactivation of linkage functions of services for each of the login users. More specifically, when the login user uses the service 200 of the linkage source, the user-based linkage function control unit 341 determines whether the login user has use-permission for the service 200 of the linkage destination, on the basis of the user privilege information database 325. Then, in a case where the user-based linkage function control unit 341 determines that the login user does not have use-permission for using the service 200 of the linkage destination, the user-based linkage function control unit 341 causes the service 200 of the linkage source to deactivate the linkage function (for example, a GUI component) with the service 200 of the linkage destination, provided by the service 200 of the linkage source.

(Specific Example of Deployment Information Database 321)

FIG. 8 is a drawing illustrating a specific example of the deployment information database 321 according to an embodiment of the present invention. As illustrated in FIG. 8, in the deployment information database 321, for each of the contract user IDs for identifying the contract users of the services 200, information indicating either activated or deactivated is associated with each of the multiple services (a "Service A", a "Service B", and a "Service C") provided by the cloud system 14. For example, in the example as illustrated in FIG. 8, for the contract user ID "Company 1", a flag "activated" is associated with each of the service IDs, the "Service A", the "Service B", and the "Service C". This indicates that the contract users with the contract user ID "Company 1" can use each of the three services, i.e., the "Service A", the "Service B", and the "Service C". For example, in the example as illustrated in FIG. 8, for the contract user ID "Company 2", a flag "activated" is associated with the service IDs "Service A" and "Service B", and a flag "deactivated" is associated with the service ID "Service C". This means that for the contract users with the contract user ID "Company 2", the services "Service A" and "Service B" are usable (i.e., deployed), and the "Service C" is unusable (i.e., not deployed). For example, the contract user ID is set for each organization in a company that is referred to as a tenant. However, the contract user ID is not limited thereto. The contract user IDs may be set in units other than the above (for example, in units of individuals in a company). The deployment information database 321 illustrated in FIG. 8 indicates either activated or deactivated for each tenant and for each service, but the deployment information database 321 is not limited thereto. For example, in the deployment information database 321, either activated or deactivated may be indicated for each user who belongs to a tenant and for each service. Alternatively, the deployment information database 321 may store only combinations of contract user IDs and service IDs that have been activated.

(Specific Example of Linkage Definition Information Database 322)

FIG. 9 is a drawing illustrating a specific example of the linkage definition information database 322 according to an embodiment of the present invention. As illustrated in FIG. 9, a linkage definition information identification number (ID) for identifying a linkage of services 200, a service ID for identifying a service 200 of a linkage source, and a service ID for identifying a service 200 of a linkage destination that is linkable with the service 200 of the linkage source are associated with one another and stored in the linkage definition information database 322. In the example as illustrated in FIG. 9, the service IDs "Service B" and "Service C" of the services 200 of the linkage destinations are associated with the service ID "Service A" of the service 200 of the linkage source. This means that the service 200 with the service ID "Service A" can be linked and used with two services 200 with the service IDs "Service B" and "Service C".

In the linkage definition information database 322, a one-way linkage-use and a bidirectional linkage-use can be defined for any given combination of two services 200.

For example, in the example as illustrated in FIG. 9, with respect to a combination of the "Service A" and the "Service B", the linkage definition information database 322 stores: linkage definition information (linkage definition information ID "1") in which the "Service A" is the linkage source and the "Service B" is the linkage destination; and linkage definition information (linkage definition information ID "3") in which the "Service B" is the linkage source and the "Service A" is the linkage destination. In other words, this indicates that the use of bidirectional linkage is possible between the "Service A" and the "Service B".

In the example as illustrated in FIG. 9, with respect to a combination of the "Service A" and the "Service C", the linkage definition information database 322 stores only linkage definition information (linkage definition information ID "2") in which the "Service A" is the linkage source and the "Service C" is the linkage destination. In other words, the use of one-way linkage is possible between the "Service A" and the "Service C".

(Specific Example of User Privilege Information Database 325)

FIG. 10 is a drawing illustrating a specific example of the user privilege information database 325 according to an embodiment of the present invention. As illustrated in FIG. 10, for each of multiple login users who can use services 200, the user ID for identifying the login user, the contract user ID of the contract user to whom the login user belongs (for example, a company, a division, and the like), and whether the login user has an administrator privilege and a user privilege for each service 200 are associated with one another and stored in the user privilege information database 325.

In FIG. 10, a flag "True" indicates that the login user is given permission, and a flag "False" indicates that the login user is not given permission. Also, a flag "Null" indicates that the service 200 is not deployed.

For example, in the example as illustrated in FIG. 10, the user privilege information database 325 indicates that the login user with the user ID "User 1" belongs to the contract user with the contract user ID "Company 1", and has the administrator privilege and the user privilege for each of the "Service A", the "Service B", and the "Service C".

In the example as illustrated in FIG. 10, the user privilege information database 325 indicates that the login user with the user ID "User 2" belongs to the contract user with the contract user ID "Company 1", and does not have the administrator privilege but has the user privilege for each of the "Service A", the "Service B", and the "Service C".

In the example as illustrated in FIG. 10, the user privilege information database 325 indicates that the login user with the user ID "User 3" belongs to the contract user with the contract user ID "Company 1", and indicates that the login user with the user ID "User 3" does not have an administrator privilege but has a user privilege for each of the "Service A" and the "Service C", and does not have the administrator privilege and user privilege for the "Service B".

In the example as illustrated in FIG. 10, the user privilege information database 325 indicates that the login user with the user ID "User 4" belongs to the contract user with the contract user ID "Company 2", and indicates that the login user with the user ID "User 4" has the administrator privilege and the user privilege for each of the "Service A" and the "Service B", and the "Service C" is not deployed (see FIG. 8).

With the management terminal 500, the deployment manager 16 can perform various kinds of setting changes in the user privilege information database 325 (for example, addition of a login user, deletion of a login user, and change of permission for a login user) as necessary.

(Specific Example of Linkage-Use Information Database 323)

FIG. 11 is a drawing illustrating a specific example of the linkage-use information database 323 according to an embodiment of the present invention. As illustrated in FIG. 11, the contract user ID for identifying the contract user of the service 200 and the linkage definition information identification number (ID) for identifying linkage of services 200 that is actually used by the contract user are associated with one another and stored in the linkage-use information database 323. The linkage definition information ID that is set in the linkage-use information database 323 corresponds to the linkage definition information ID that is set in the linkage definition information database 322 as illustrated in FIG. 9. For example, in the example as illustrated in FIG. 11, linkage definition information IDs "1" and "3" are associated with the contract user ID "Company 1". This indicates that the contract user with the contract user ID "Company 1" is actually using a linkage of services 200 having linkage definition information ID "1" (linkage source="Service A", linkage destination="Service B") as illustrated in FIG. 9 and a linkage of services 200 having linkage definition information ID "3" (linkage source="Service B", linkage destination="Service A") as illustrated in FIG. 9. Registration of information to the linkage-use information database 323 (i.e., whether a linkage function of services 200 is used) may be set, for example, manually by the deployment manager 16 with the management terminal 500 or automatically by the management server 300 according to the situations of uses of linkage function of services 200.

(Procedure of New-Deployment Processing)

Figure 12:
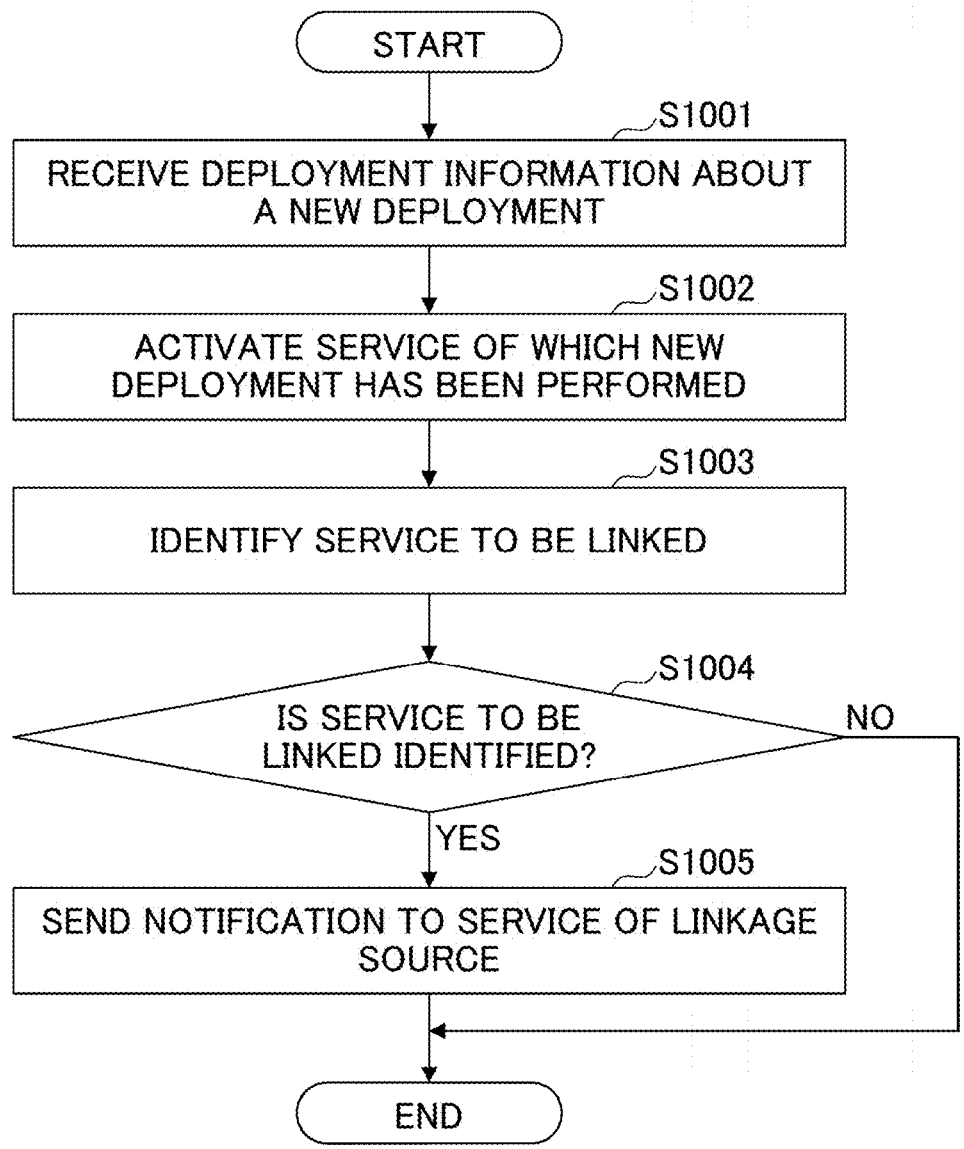
FIG. 12 is a flowchart illustrating a procedure of new-deployment processing performed by a management server according to the embodiment of the present invention.

FIG. 12 is a flowchart illustrating a procedure of new-deployment processing of the management server 300 according to an embodiment of the present invention.

First, the deployment information reception unit 331 receives, via the communication network 12, deployment information about a new deployment transmitted from the management terminal 500 (step S1001). The deployment information about a new deployment includes at least a contract user identification number (ID) for identifying the contract user and a service identification number (ID) for identifying a service 200 of which a new deployment has been performed. In a case where new deployments have been performed for the multiple services 200, the deployment information about the new deployments include respective service IDs of the multiple services 200.

Subsequently, the service activation unit 332 activates the service 200 of which the new deployment has been performed with respect to the contract user who has performed the new deployment, on the basis of the deployment information about the new deployment received in step S1001 (step S1002). More specifically, the service activation unit 332 sets "activated" in the deployment information database 321 for a combination of the contract user ID of the contract user who has performed the new deployment and the service ID of the service 200 of which the new deployment has been performed.

Subsequently, the linkage service identification unit 333 identifies a service 200 that is to be linked with the service 200 of which the new deployment has been performed (step S1003). More specifically, by referring to the linkage definition information database 322, the linkage service identification unit 333 identifies, as a service 200 that is to be linked with the service 200 of which the new deployment has been performed, a service ID of another service 200 associated with the service ID of the service 200 of which the new deployment has been performed. For example, in a case where the service 200 of which the new deployment has been performed is the "Service A", as illustrated in FIG. 9, the linkage service identification unit 333 identifies, as the services 200 to be linked, the "Service B" and the "Service C" on the basis of the linkage definition information database 322.

Subsequently, the linkage function activation unit 334 determines whether the service 200 that is to be linked with the service 200 of which the new deployment has been performed has been identified in step S1003 (step S1004).

In a case where the service 200 that is to be linked has not been identified in step S1004 (step S1004: No), the management server 300 ends the series of processing as illustrated in FIG. 12.

In a case where the service 200 that is to be linked has been identified in step S1004 (step S1004: Yes), the linkage function activation unit 334 notifies, of the service 200 of the linkage source from among the service 200 of which the new deployment has been performed and the service 200 to be linked therewith, that the service 200 of the linkage source is to enable the use of the service 200 of the linkage destination (step S1005). Then, the management server 300 ends the series of processing as illustrated in FIG. 12.

For example, in step S1005, in a case where the service 200 of which the new deployment has been performed (the "Service A") is the service of the linkage source, and the services 200 linked therewith (the "Service B" and the "Service C") are the services of the linkage destinations, the linkage function activation unit 334 notifies, of the "Service A", that the contract user who has performed the new deployment is to be enabled to link with and use the "Service B" and the "Service C" from the "Service A". When the "Service A" receives this notification, for example, the "Service A" activates the function for linking with and using the "Service B" and the "Service C" on the GUI of the "Service A" provided to the contract user who has performed the new deployment. Accordingly, by using a terminal apparatus such as the interactive whiteboard 100, the contract user who has performed the new deployment can be linked and used with the "Service B" and the "Service C" on the GUI of the "Service A".

Also, for example, in step S1005, in a case where the service 200 of which the new deployment has been performed (the "Service A") is the service of the linkage destination, and the service 200 linked therewith, i.e., the "Service B", is the service of the linkage source, the linkage function activation unit 334 notifies, of the "Service B", that the contract user who has performed the new deployment is to be enabled to link with and use the "Service A" from the "Service B". When the "Service B" receives this notification, for example, the "Service B" activates the function for linking with and using the "Service A" on the GUI of the "Service B" provided to the contract user who has performed the new deployment. Accordingly, by using a terminal apparatus such as the interactive whiteboard 100, the contract user who has performed the new deployment can be linked and used with the "Service A" on the GUI of the "Service B".

(Procedure of Additional-Deployment Processing)

Figure 13:
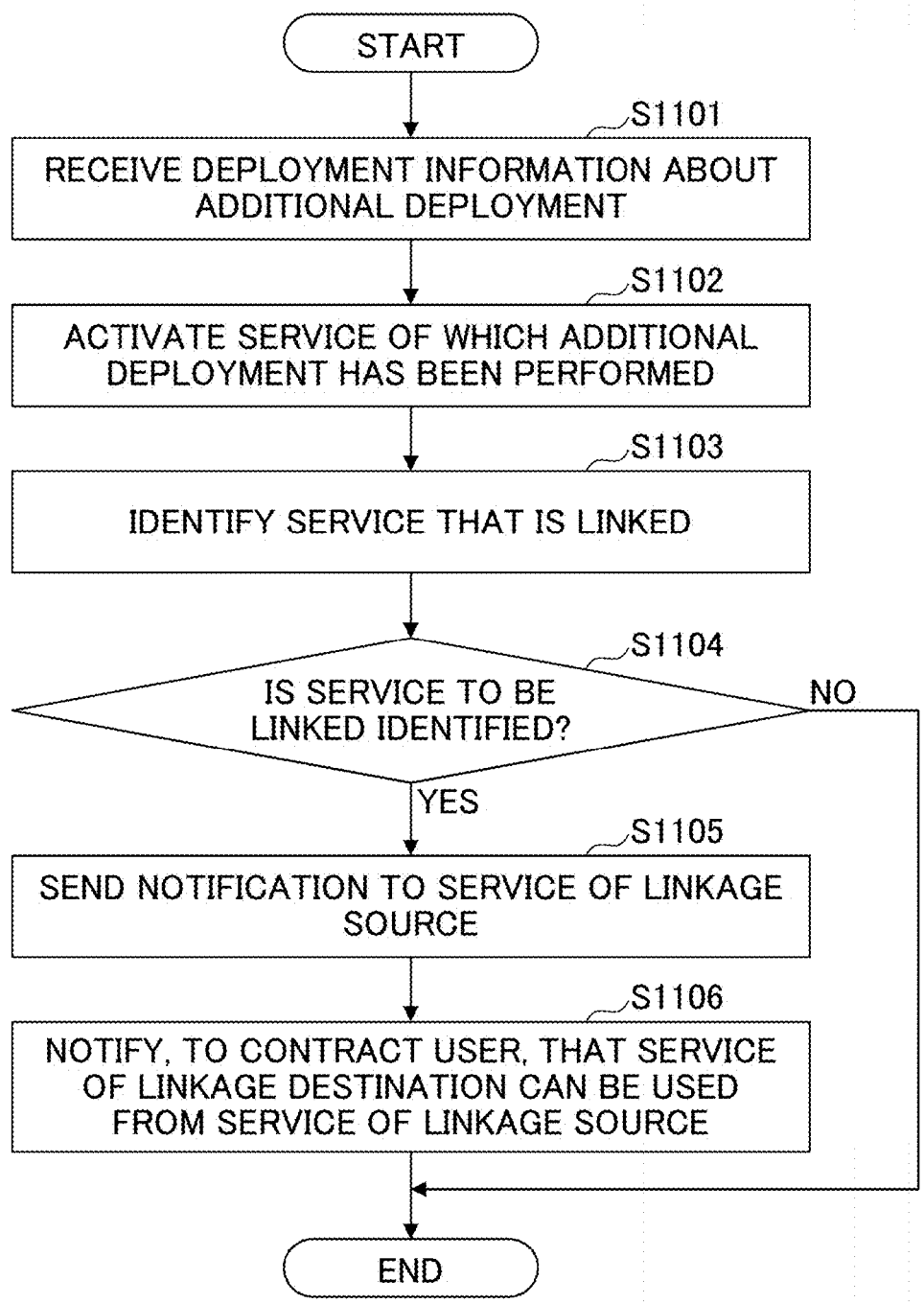
FIG. 13 is a flowchart illustrating a procedure of additional-deployment processing performed by a management server according to the embodiment of the present invention.

FIG. 13 is a flowchart illustrating a procedure of additional-deployment processing performed by the management server 300 according to an embodiment of the present invention.

First, the deployment information reception unit 331 receives, via the communication network 12, deployment information about an additional deployment transmitted from the management terminal 500 (step S1101). The deployment information about an additional deployment includes at least a contract user ID for identifying the contract user and a service ID for identifying a service 200 of which an additional deployment has been performed. In a case where new deployments have been performed for multiple services 200, the deployment information about the additional deployments include respective service IDs of the multiple services 200.

Subsequently, the service activation unit 332 activates the service 200 of which the additional deployment has been performed with respect to the contract user who has performed the additional deployment, on the basis of the deployment information about the additional deployment received in step S1101 (step S1102). More specifically, the service activation unit 332 sets "activated" in the deployment information database 321 for a combination of the contract user ID of the contract user who has performed the additional deployment and the service ID of the service 200 of which the additional deployment has been performed.

Subsequently, the linkage service identification unit 333 identifies a service 200 that is to be linked with a service 200 of which the additional deployment has been performed (step S1103). More specifically, by referring to the linkage definition information database 322, the linkage service identification unit 333 identifies, as a service 200 that is to be linked with the service 200 of which the additional deployment has been performed, a service ID of another service 200 associated with the service ID of the service 200 of which the additional deployment has been performed. For example, in a case where the service 200 of which the additional deployment has been performed is the "Service C", as illustrated in FIG. 9, the linkage service identification unit 333 identifies, as the service 200 to be linked, the "Service A" on the basis of the linkage definition information database 322.

Subsequently, in step S1103, the linkage function activation unit 334 determines whether the service 200 that is to be linked with the service 200 of which the additional deployment has been performed has been identified (step S1104).

In a case where the service 200 that is to be linked has not been identified in step S1104 (step S1104: No), the management server 300 ends the series of processing as illustrated in FIG. 13.

In a case where the service 200 that is to be linked has been identified in step S1104 (step S1104: Yes), the linkage function activation unit 334 notifies, of the service 200 of the linkage source from among the service 200 of which the additional deployment has been performed and the service 200 to be linked therewith, that the service 200 of the linkage source is to enable the use of the service 200 of the linkage destination (step S1105).

For example, in step S1105, in a case where the service 200 of which the additional deployment has been performed (the "Service C") is the service of the linkage destination, and the service 200 linked therewith (the "Service A") is the service of the linkage source, the linkage function activation unit 334 notifies, of the "Service A", that the contract user who has performed the additional deployment is to be enabled to link with and use the "Service C" from the "Service A". When the "Service A" receives this notification, for example, the "Service A" activates the function for linking with and using the "Service C" on the GUI of the "Service A" provided to the contract user who has performed the additional deployment. Accordingly, by using a terminal apparatus such as the interactive whiteboard 100, the contract user who has performed the additional deployment can be linked and used with the "Service C" on the GUI of the "Service A".

Thereafter, the contract user notification unit 335 notifies, of the contract user, that the service of the linkage destination can be used from the service of the linkage source (step S1106). Then, the management server 300 ends the series of processing as illustrated in FIG. 13.

For example, in step S1106, in a case where the additional deployment for the "Service C" has been performed and accordingly, the "Service A" enables linking with and using the "Service C", the contract user notification unit 335 transmits, to the terminal apparatus used by the contract user who has performed the additional deployment, a message such as, "Thank you for the deployment of the Service C. A linkage setting with the Service C can also be found on the setting screen of the Service A." Accordingly, the message is displayed on the display unit of the terminal apparatus used by the contract user who has performed the additional deployment. However, the notification is not limited thereto, and the contract user notification unit 335 may employ other notification methods such as transmitting the message to a predetermined e-mail address.

(Procedure of Deployment Cancellation Processing)

Figure 14:
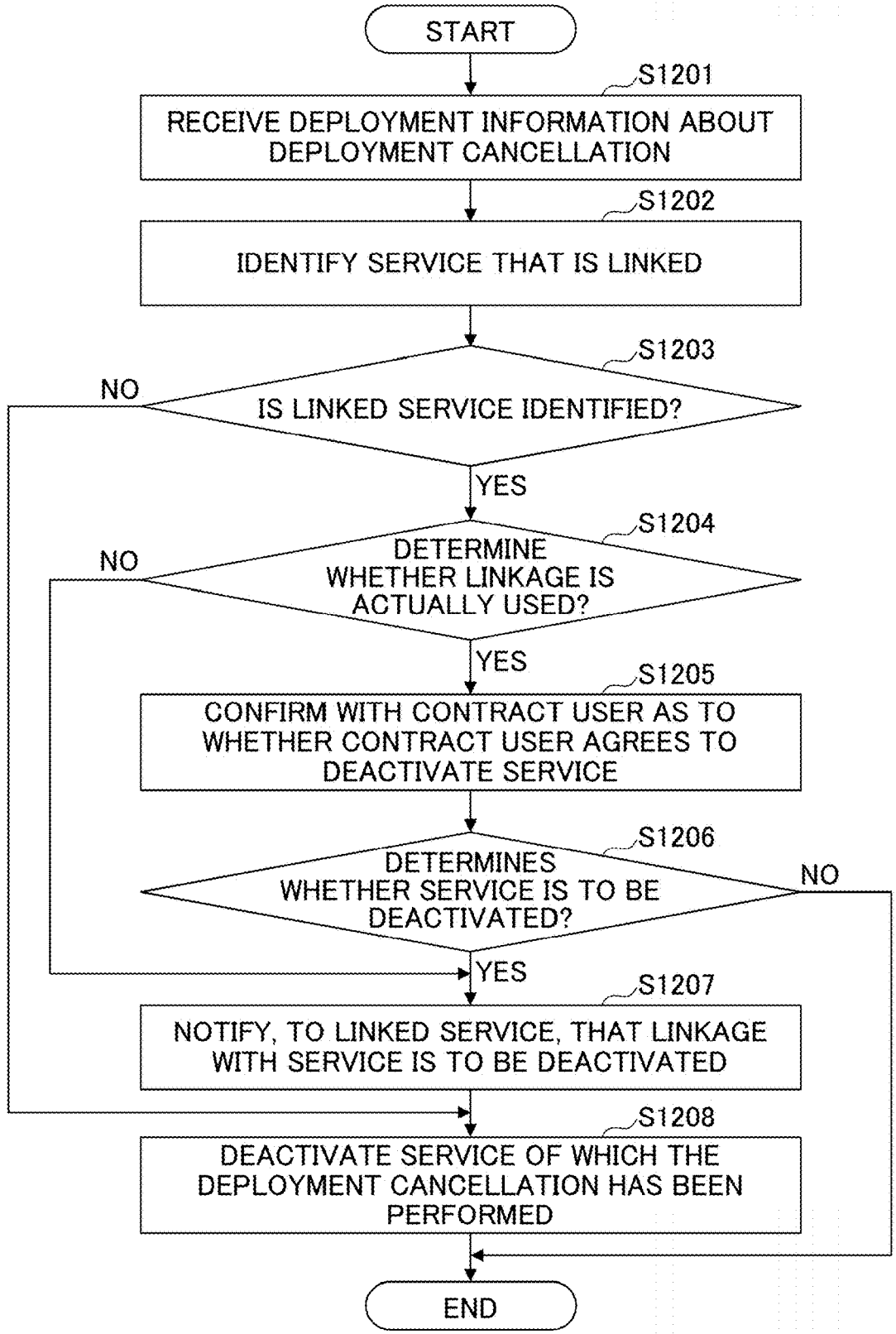
FIG. 14 is a flowchart illustrating a procedure of deployment cancellation processing performed by the management server according to the embodiment of the present invention.

FIG. 14 is a flowchart illustrating a procedure of deployment cancellation processing performed by the management server 300 according to an embodiment of the present invention.

First, the deployment information reception unit 331 receives, via the communication network 12, deployment information about deployment cancellation transmitted from the management terminal 500 (step S1201). The deployment information about deployment cancellation includes at least a contract user ID for identifying the contract user and a service ID for identifying a service 200 of which deployment cancellation has been performed. In a case where deployment cancellation has been performed for multiple services 200, the deployment information about deployment cancellations includes respective service IDs of the multiple services 200.

Subsequently, the linkage service identification unit 333 identifies the service 200 linked with the service 200 of which the deployment cancellation has been performed (step S1202). More specifically, by referring to the linkage definition information database 322, the linkage service identification unit 333 identifies, as a service 200 linked with the service 200 of which the deployment cancellation has been performed, a service ID of another service 200 associated with the service ID of the service 200 of which the deployment cancellation has been performed. For example, in a case where the service 200 of which the deployment cancellation has been performed is the "Service B", as illustrated in FIG. 9, the linkage service identification unit 333 identifies, as the linked service 200, the "Service A" on the basis of the linkage definition information database 322.

Subsequently, in step S1202, the linkage function activation unit 334 determines whether the service 200 linked with the service 200 of which the deployment cancellation has been performed has been identified (step S1203).

In a case where the linked service 200 has not been identified in step S1203 (step S1203: No), the service activation unit 332 deactivates the service 200 of which the deployment cancellation has been performed for the contract user who has performed the deployment cancellation on the basis of the deployment information about deployment cancellation received in step S1201 (step S1208). More specifically, the service activation unit 332 sets "deactivated" in the deployment information database 321 for a combination of the contract user ID of the contract user who has performed the deployment cancellation and the service ID of the service 200 of which the deployment cancellation has been performed. Thereafter, the management server 300 ends the series of processing as illustrated in FIG. 14.

In a case where the linked service 200 has been identified in step S1203 (step S1203: Yes), the service activation unit 332 determines whether a linkage between the service 200 of which the deployment cancellation has been performed and the service 200 linked therewith is actually used by the contract user who has performed the deployment cancellation by referring to the linkage-use information database 323 (step S1204).

In a case where the linkage between the service 200 of which the deployment cancellation has been performed and the service 200 linked therewith is actually used by the contract user who has performed the deployment cancellation in step S1204 (step S1204: Yes), the contract user confirmation unit 336 confirms with the contract user as to whether the contract user agrees to deactivate the service 200 of which the deployment cancellation has been performed (step S1205). For example, in a case where the linkage from the "Service A" to the "Service B" is disabled as a result of the deployment cancellation for the "Service B", the contract user confirmation unit 336 transmits, the terminal apparatus used by the contract user who has performed the deployment cancellation, a message such as, "If the Service B is cancelled, the function on the Service A that can be linked with the Service B will be disabled. Are you sure you wish to cancel the Service B?" Accordingly, the message is displayed on the display unit of the terminal apparatus used by the contract user who has performed the deployment cancellation.

Then, the contract user confirmation unit 336 determines whether the service 200 of which the deployment cancellation has been performed is to be deactivated on the basis of the result of the confirmation by the contract user obtained in step S1205 (step S1206).

In a case where the linkage between the service 200 of which the deployment cancellation has been performed and the service 200 linked therewith is actually not used by the contract user who has performed the deployment cancellation in step S1204 (step S1204: No), or in a case where the service 200 of which the deployment cancellation has been performed is to be deactivated in step S1206 (step S1206: Yes), the linkage function activation unit 334 notifies, of the service 200 linked with the service 200 of which the deployment cancellation has been performed, that the linkage with the service 200 of which the deployment cancellation has been performed is to be deactivated (step S1207). Then, the service activation unit 332 deactivates the service 200 of which the deployment cancellation has been performed for the contract user who has performed the deployment cancellation (step S1208). More specifically, the service activation unit 332 deletes, from the deployment information database 321, an association between the contract user ID of the contract user who has performed the deployment cancellation and the service ID of the service 200 of which the deployment cancellation has been performed. Thereafter, the management server 300 ends the series of processing as illustrated in FIG. 14.

In a case where the contract user confirmation unit 336 determines that the service 200 of which the deployment cancellation has been performed is not to be deactivated in step S1206 (step S1206: No), the management server 300 ends the series of processing as illustrated in FIG. 14. In this case, because the contract user does not wish to deactivate the linkage of services 200, the deployment cancellation for cancelling the service 200 is cancelled or put on abeyance.

(Example of Display Screen for Making Additional Deployment of Service 200)

Figure 16:
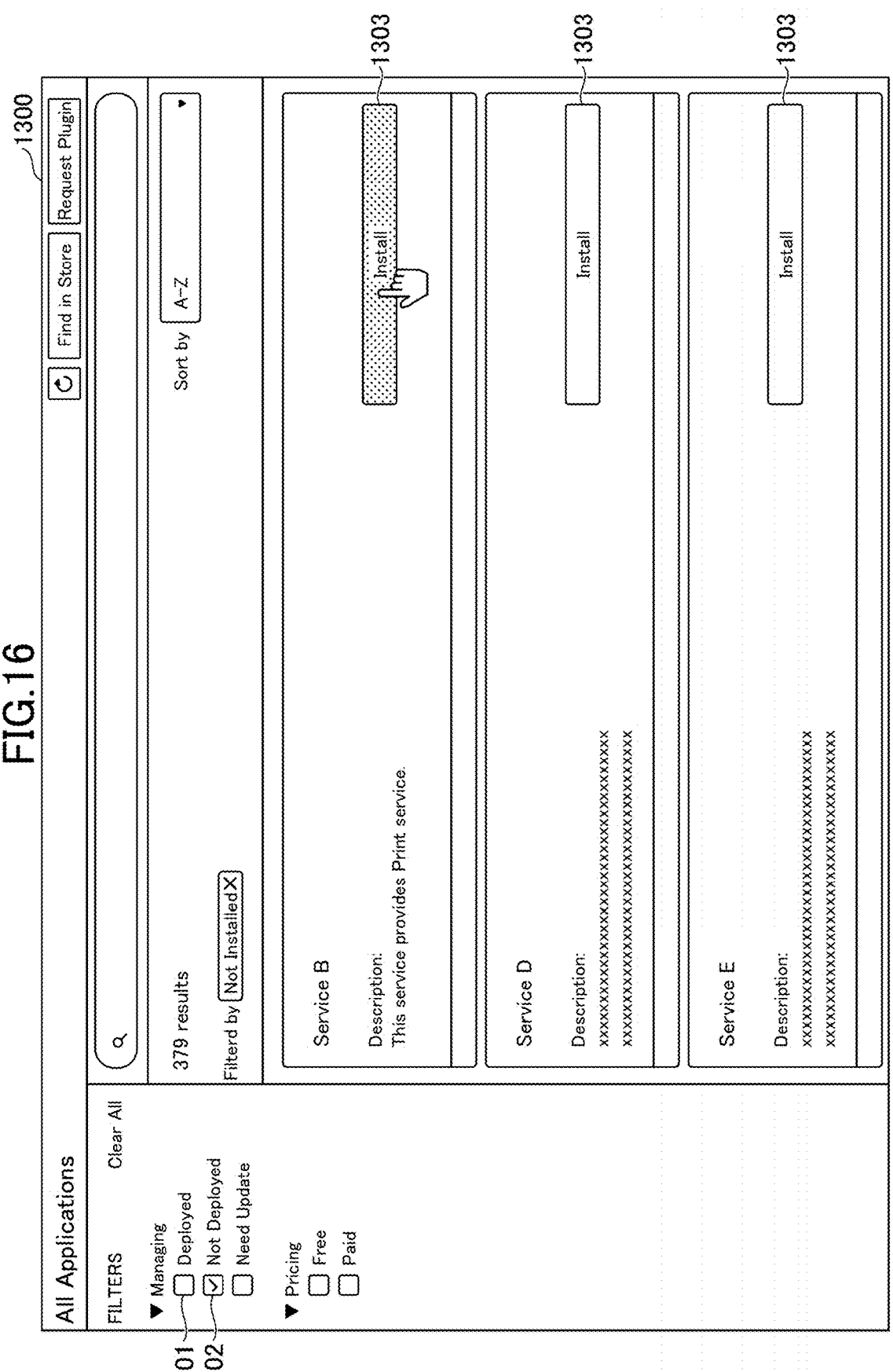
FIG. 16 is a drawing illustrating an example of a display screen that is displayed on the management terminal according to the embodiment of the present invention when an additional deployment of a service is performed.
Figure 17:
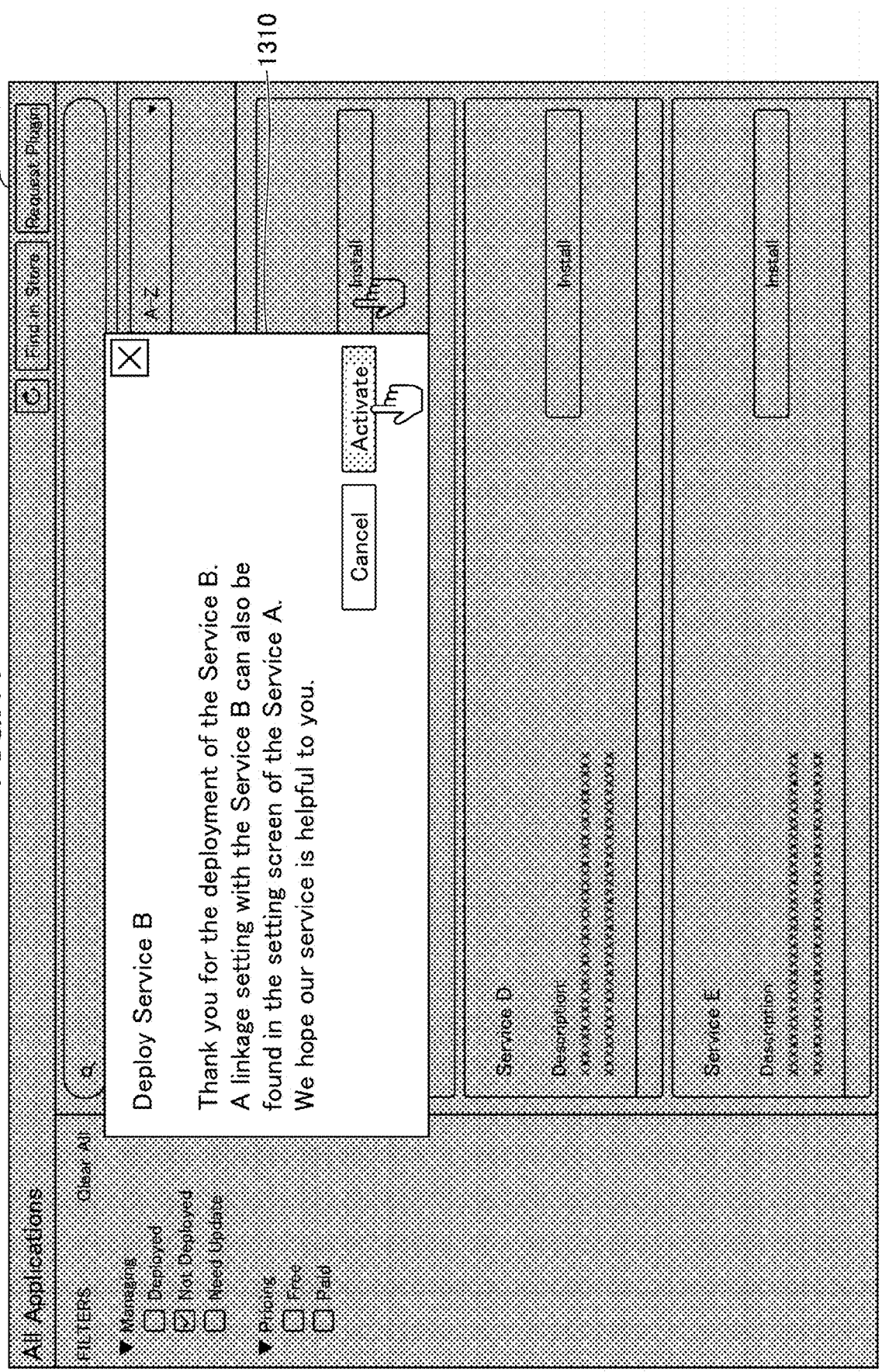
FIG. 17 is a drawing illustrating an example of a display screen that is displayed on the management terminal according to the embodiment of the present invention when an additional deployment of a service is performed.

FIG. 15 to FIG. 17 are drawings illustrating examples of display screens for making an additional deployment of a service 200, which are displayed on the management terminal 500 according to an embodiment of the present invention.

A display screen 1300 as illustrated in FIG. 15 to FIG. 17 is a display screen displayed on the display unit of the management terminal 500. The display screen 1300 is a display screen of an application for managing deployments of services 200 of any given contract user A. The display screen 1300 can be used on the management terminal 500 when the deployment manager 16, who manages deployments, logs in to the management server 300 from the management terminal 500. On the display screen 1300, the deployment manager 16 can perform, with respect to the contract user A, confirmation of a service 200 of which the deployment has been performed, confirmation of a service 200 of which the deployment has not been performed, additional deployment of a service 200, deployment cancellations for cancelling a service 200, and the like. As illustrated in FIG. 15, the display screen 1300 includes a checkbox 1301 and a checkbox 1302.

The checkbox 1301 is labelled a text "Deployed". When the deployment manager 16 checks the checkbox 1301, multiple services 200 deployed by the contract user A from among multiple services 200 provided by the cloud system 14 are displayed as a list on the display screen 1300 on the basis of the deployment information about the contract user A that is set in the deployment information database 321 of the management server 300.

The checkbox 1302 is attached with a text "Not Deployed". When the deployment manager 16 checks the checkbox 1302, multiple services 200 not deployed by the contract user A from among multiple services 200 provided by the cloud system 14 are displayed as a list on the display screen 1300 on the basis of the deployment information about the contract user A that is set in the deployment information database 321 of the management server 300.

On the display screen 1300, the deployment manager 16 can perform an additional deployment of a service 200. For example, in the example as illustrated in FIG. 15 and FIG. 16, three services 200, i.e., the "Service B", a "Service D", and a "Service E", that have not been deployed by the contract user A are displayed on the display screen 1300. On the display screen 1300, an install button 1303 with a label "Install" is provided for each service 200. Two services 200, i.e., the "Service A" and the "Service C", that are not displayed on the display screen 1300 are services 200 that have been deployed by the contract user A. For example, as illustrated in FIG. 16, the deployment manager 16 can perform an additional deployment of the "Service B" by operating (e.g., clicking or touching) the install button 1303 for the "Service B".

In this case, the management server 300 transmits deployment information for the additional deployment of the "Service B". When the management server 300 receives the deployment information, the management server 300 performs the additional-deployment processing explained above and adds the "Service B" to the contract user ID of the contract user A in the deployment information database 321, so that the use of the "Service B" by the contract user A is activated. Accordingly, the contract user A can use three services 200, i.e., the "Service A", the "Service B", and the "Service C".

As explained above, the "Service B" is enabled to be linked with and used from the "Service A". Then, the management server 300 transmits, to the management terminal 500, a message, "Thank you for the deployment of the Service B. A linkage setting with the Service B can also be found on the setting screen of the Service A. We hope our service is helpful to you." As illustrated in FIG. 17, the management terminal 500 displays the message in a pop-up screen 1310, so that the message can be notified to the deployment manager 16.

(Examples of Display Screens when the Deployment Cancellation for Cancelling the Service 200 is Performed)

FIG. 18 to FIG. 21 are drawings illustrating examples of display screens for performing deployment cancellation for cancelling a service 200, which are displayed on the management terminal 500 according to an embodiment of the present invention.

Figure 18:
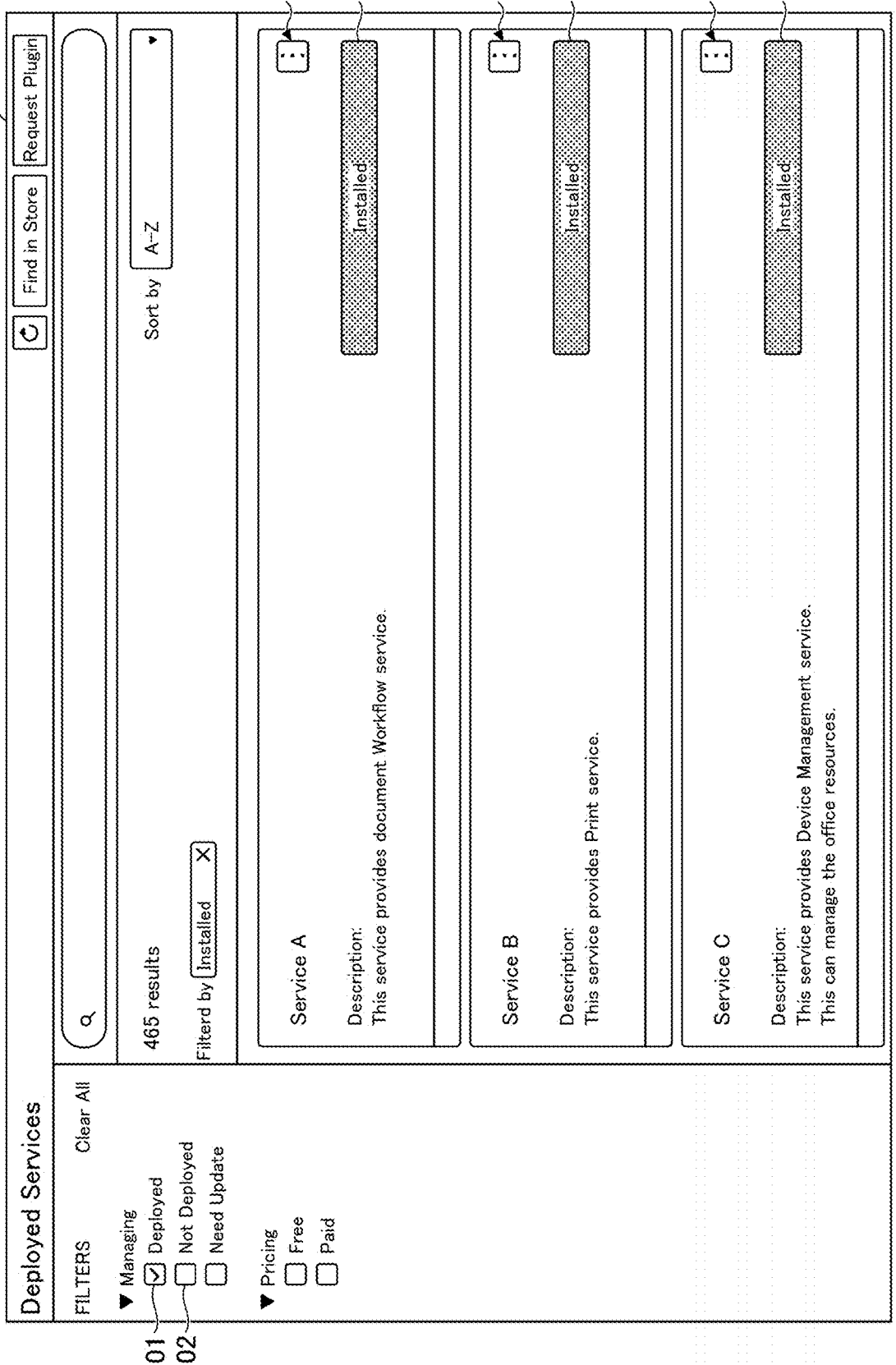
FIG. 18 is a drawing illustrating an example of a display screen that is displayed on the management terminal according to the embodiment of the present invention when a deployment of a service is cancelled.

In the example as illustrated in FIG. 18, on the display screen 1300 similar to FIG. 15 to FIG. 17, the deployment manager 16 checks the checkbox 1301. In response, three services 200, i.e., the "Service A", the "Service B", and the "Service C", that have been deployed by the contract user A are displayed as a list on the display screen 1300. On the display screen 1300 as illustrated in FIG. 18, instead of the install button 1303 as illustrated in FIG. 15 to FIG. 17, a grayed-out button 1304 with a label "Installed" indicating that a service 200 has already been deployed is displayed for each service 200.

On the display screen 1300 as illustrated in FIG. 18, a drop-down button 1305 is displayed for each service 200. On the display screen 1300, by selecting the drop-down button 1305 of a desired service 200, the deployment manager 16 can cause a drop-down list 1306 to be displayed, and can select a desired action from the drop-down list 1306.

Figure 19:
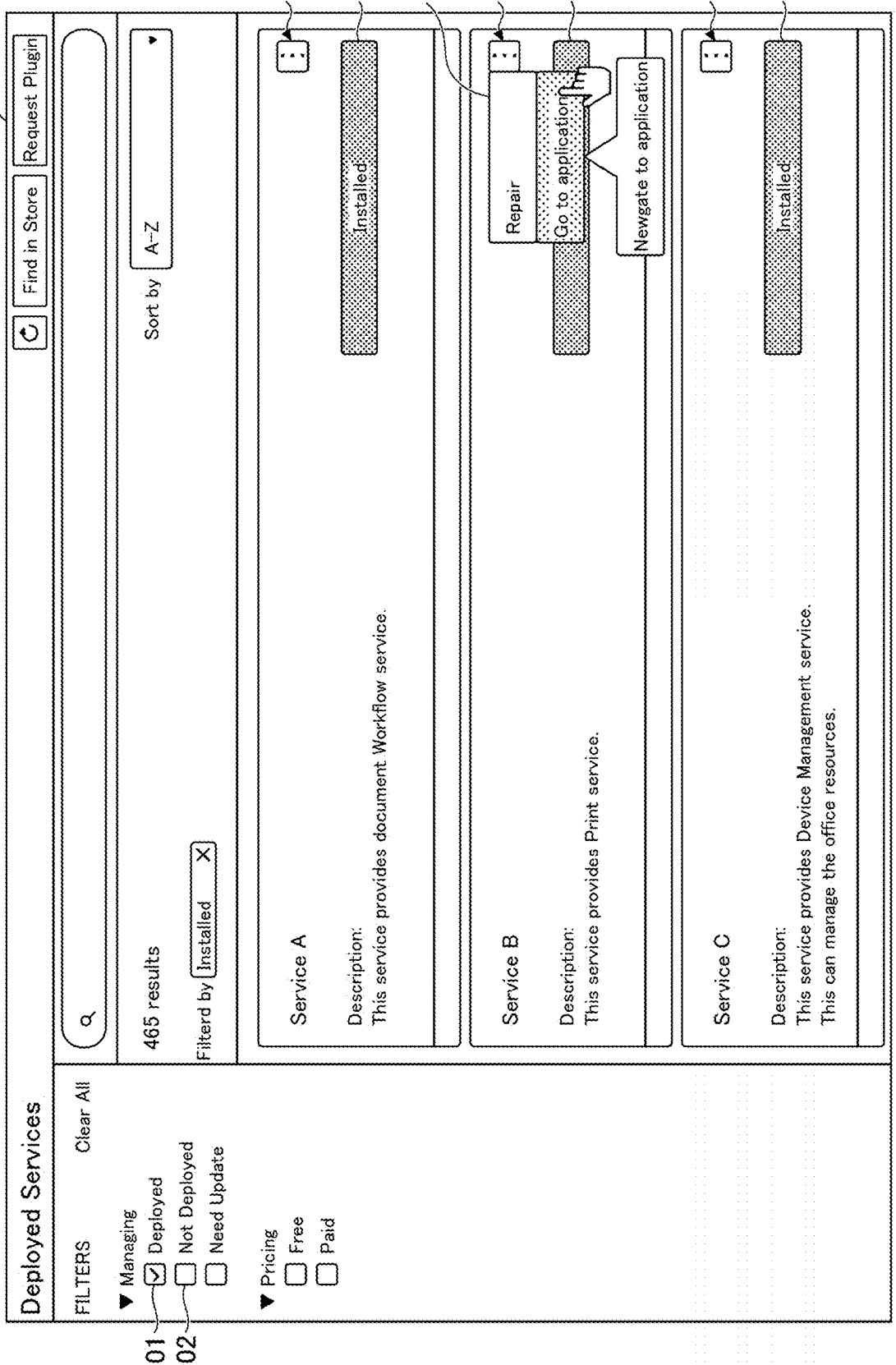
FIG. 19 is a drawing illustrating an example of a display screen that is displayed on the management terminal according to the embodiment of the present invention when a deployment of a service is cancelled.

For example, in the example as illustrated in FIG. 19, on the display screen 1300, the deployment manager 16 selects the drop-down button 1305 of the "Service B", so that the drop-down list 1306 of the "Service B" is displayed. Then, in this drop-down list 1306, the deployment manager 16 selects an action "Go to application". Accordingly, on the display unit of the management terminal 500, as illustrated in FIG. 20, a service detail screen 1800 indicating the detailed content of the "Service B" is displayed.

On this service detail screen 1800, the deployment manager 16 can perform deployment cancellation of the "Service B". More specifically, as illustrated in FIG. 20, on the service detail screen 1800, a link 1801 with a label "Uninstall" is displayed. By operating this link 1801, the deployment manager 16 can perform deployment cancellation of the "Service B". In this case, deployment information about deployment cancellation of the "Service B" is transmitted to the management server 300.

As explained above, the "Service A" can be linked and used with the "Service B". Then, the management server 300 transmits, to the management terminal 500, a message such as, "If the Service B is cancelled, the function on the Service A that can be linked with the Service B will be disabled. Are you sure you wish to cancel the Service B?" As illustrated in FIG. 21, the management terminal 500 displays the message on a pop-up screen 1810, so that the message can be notified to the deployment manager 16.

Figure 21:
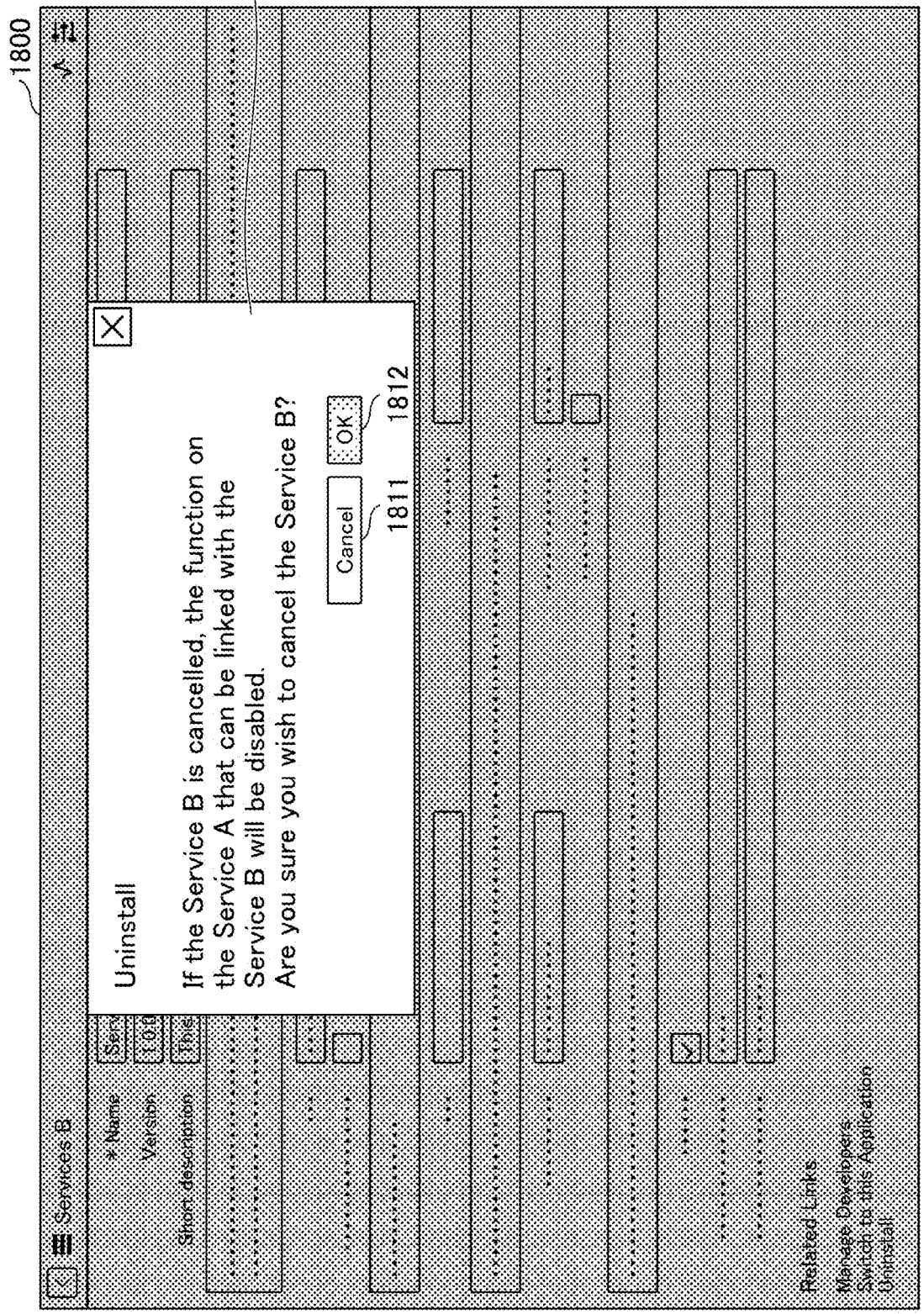
FIG. 21 is a drawing illustrating an example of a display screen that is displayed on the management terminal according to the embodiment of the present invention when a deployment of a service is cancelled.

As illustrated in FIG. 21, a cancellation button 1811 and an OK button 1812 are on the pop-up screen 1810. By selecting the cancellation button 1811, the deployment manager 16 can cancel the deployment cancellation of the "Service B". Conversely, by selecting the OK button 1812, the deployment manager 16 can confirm the deployment cancellation of the "Service B". Then, either cancellation or confirmation of the deployment cancellation of the "Service B" is notified from the management terminal 500 to the management server 300.

When the management server 300 receives a notification of cancellation of the deployment cancellation of the "Service B", the management server 300 performs the deployment cancellation processing explained above to delete, from the deployment information database 321, the "Service B" associated with the contract user ID of the contract user A, so that the use of the "Service B" by the contract user A is deactivated. As a result, the contract user A can use the remaining two services 200 (the "Service A" and the "Service C").

(First Specific Example of Linkage Function of Services 200)

Figure 22:
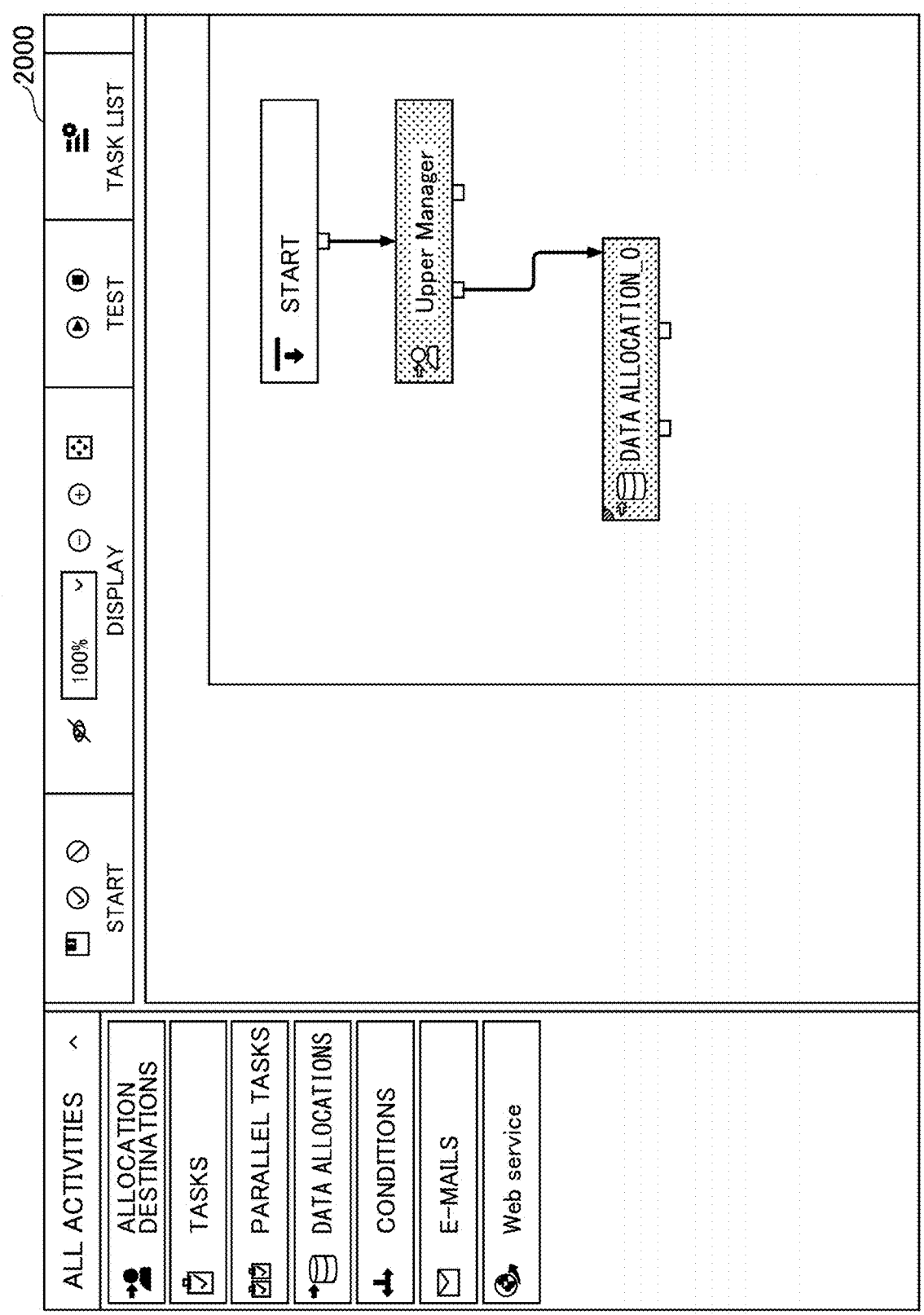
FIG. 22 is a drawing illustrating a first specific example of a linkage function of the service provided to the contract user.
Figure 23:
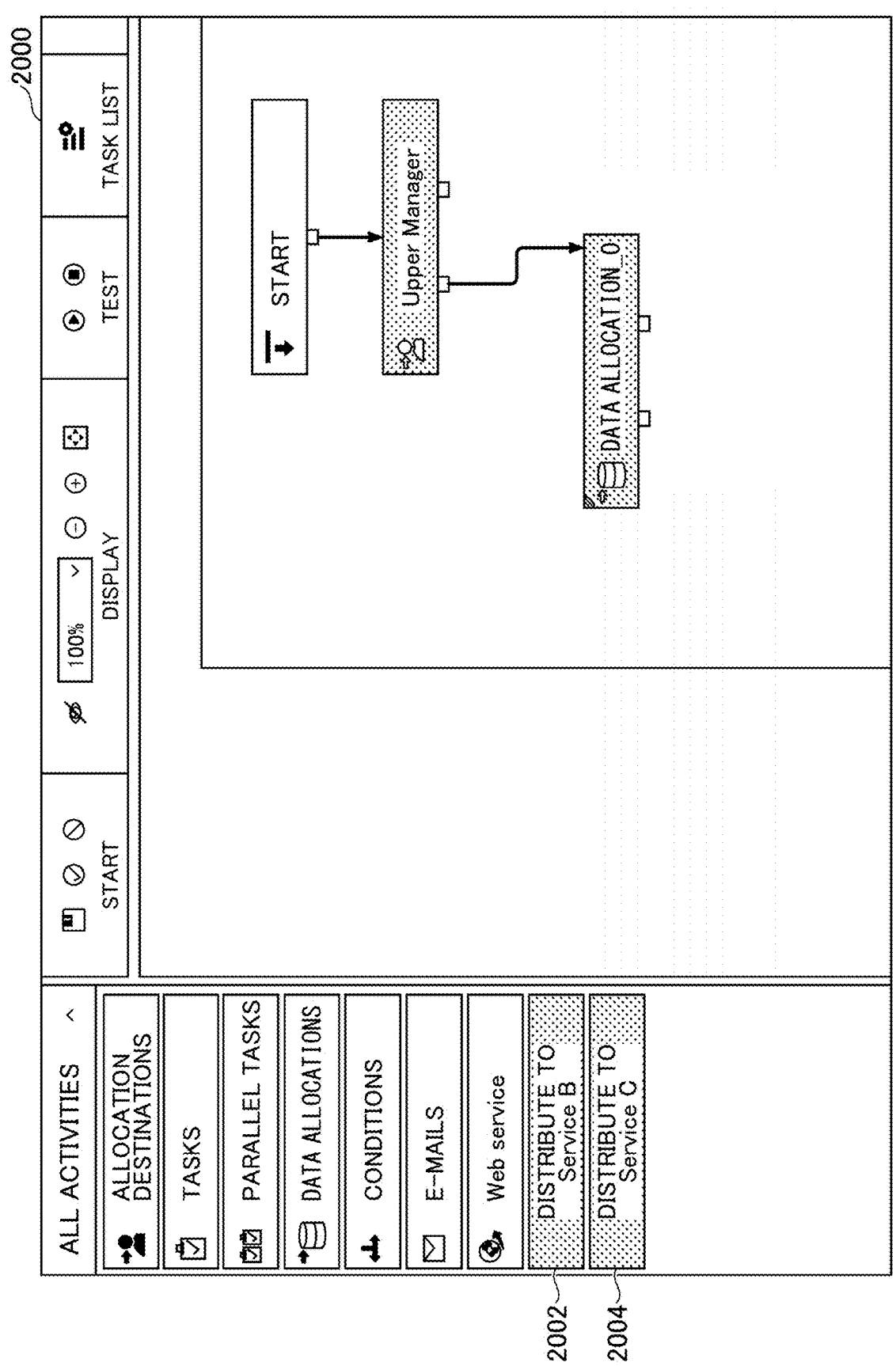
FIG. 23 is a drawing illustrating the first specific example of the linkage function of the service provided to the contract user.

FIG. 22 and FIG. 23 are drawings illustrating a first specific example of a linkage function of the service 200 provided to the contract user. A display screen 2000 as illustrated in FIG. 22 and FIG. 23 is a display screen displayed on a display unit of a terminal apparatus (for example, a PC, a tablet terminal, a smartphone, and the like) used by any given contract user A. The display screen 2000 is a generation screen of a workflow provided by a workflow service (an example of the "Service A" explained above). On the display screen 2000, the contract user A can perform generation and the like of workflows.

FIG. 22 illustrates the display screen 2000 that comes prior to the deployment of the "Service B" and the "Service C" by the contract user A. FIG. 23 illustrates the display screen 2000 that comes after the deployment of the "Service B" and the "Service C" by the contract user A.

On the display screen 2000 as illustrated in FIG. 23, the linkage function between the "Service B" and the "Service C" is activated, so that distribute buttons 2002 and 2004 for using the linkage function between the "Service B" and the "Service C" are displayed.

For example, by selecting the distribute button 2002, the contract user A can distribute, to the "Service B", the workflow generated on the display screen 2000. For example, by selecting the distribute button 2004, the contract user A can distribute, to the "Service C", the workflow generated on the display screen 2000.

FIG. 23 illustrates an example in which a user privilege for each of the "Service B" and the "Service C" is given to a login user managed by the contract user A in the user privilege information database 325. For example, in a case where the contract user A can use (i.e., has deployed) the "Service B" and the "Service C" but a user privilege for either the "Service B" or the "Service C" is not given to the login user managed by the contract user A, either the distribute button 2002 or 2004 will not be displayed on the display screen 2000 used by the login user.

(Second Specific Example of Linkage Function of Services 200)

Figure 24:
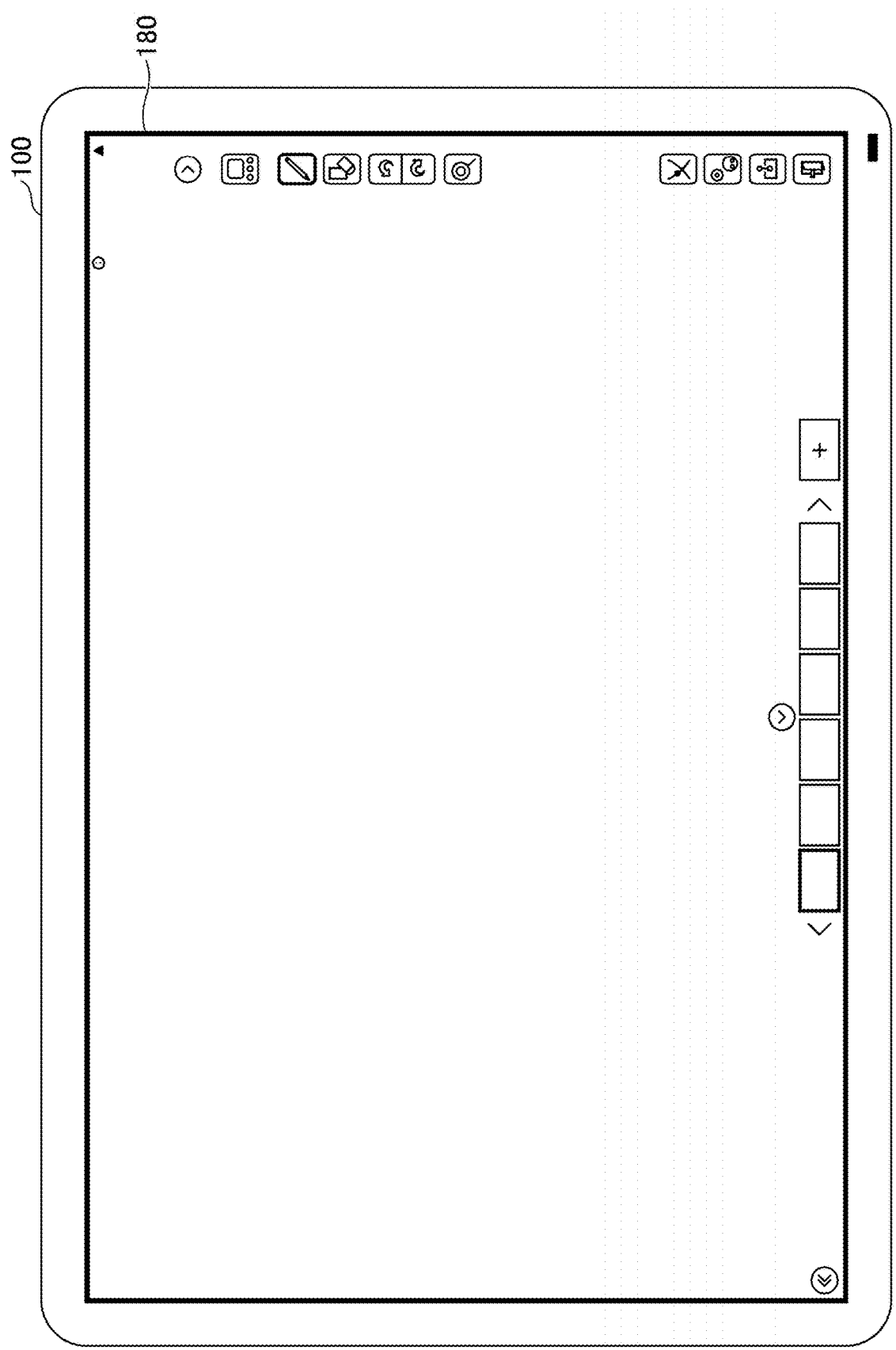
FIG. 24 is a drawing illustrating a second specific example of a linkage function of the service provided to the contract user.
Figure 25:
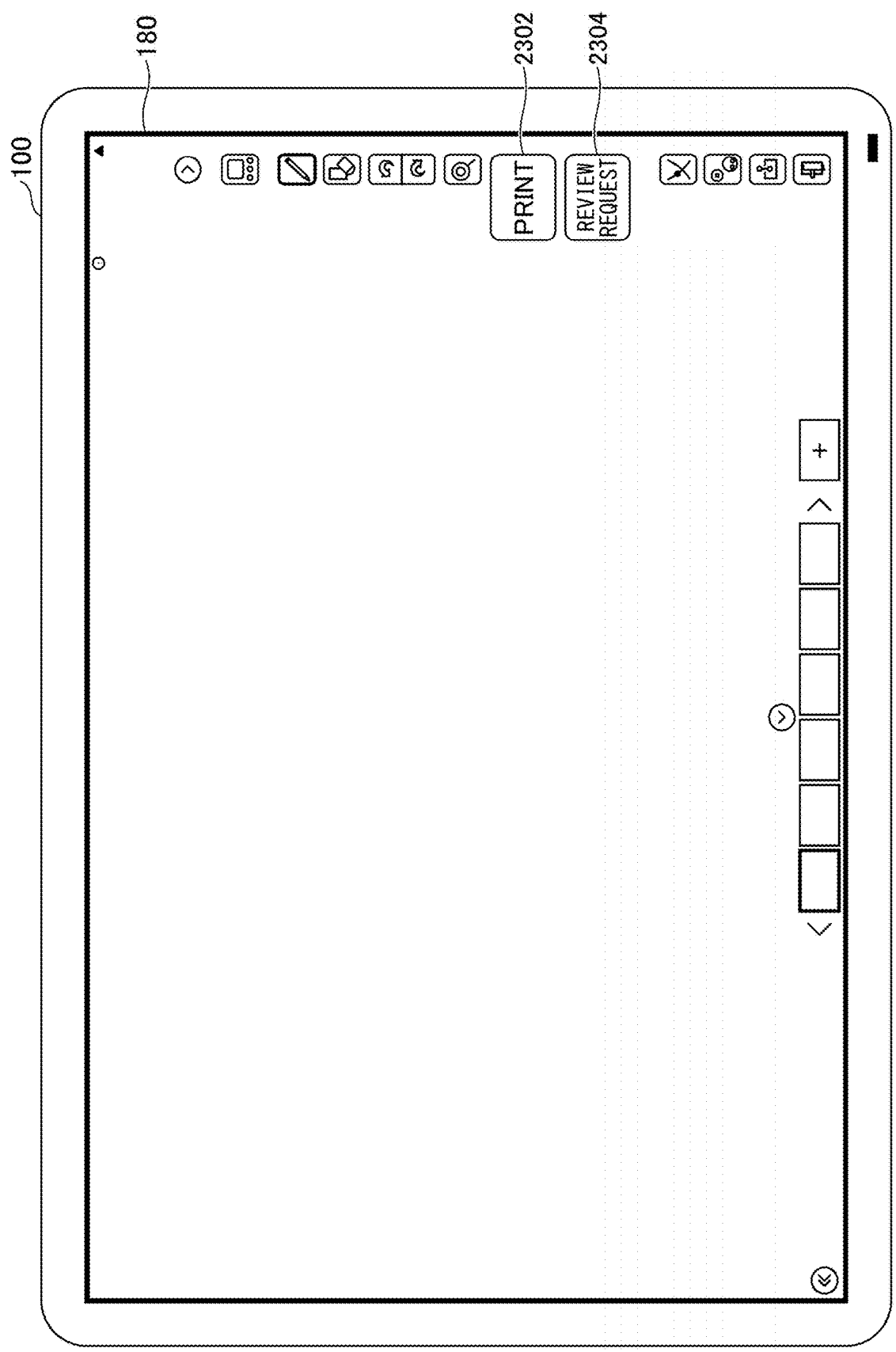
FIG. 25 is a drawing illustrating the second specific example of the linkage function of the service provided to the contract user.

FIG. 24 and FIG. 25 are drawings illustrating a second specific example of a linkage function of the service 200 provided to the contract user. FIG. 24 and FIG. 25 illustrate examples of displays the display unit 180 of the interactive whiteboard 100 when any given contract user A is using any given service (an example of the "Service A" explained above) with the interactive whiteboard 100. The contract user A can write content to the display unit 180.

FIG. 24 illustrates an example of display screen that comes prior to the deployment of the "Service B" and the "Service C" by the contract user A. FIG. 25 illustrates an example of display screen that comes after the deployment of the "Service B" and the "Service C" by the contract user A. Hereinafter, the "Service B" is referred to as a print service which the "Service A" can link with and use, and the "Service C" is referred to as a workflow service which the "Service A" can link with and use.

On the display unit 180 in FIG. 25, a print button 2302 and a request review button 2304 for using the linkage function between the "Service B" and the "Service C" are displayed in response to activation of the linkage function between the "Service B" (the print service) and the "Service C" (the workflow service).

For example, by selecting the print button 2302, the contract user A can distribute the display content displayed on the display unit 180 to the "Service B" (the print service) and cause the "Service B" to print the display content. For example, by selecting the request review button 2304, the contract user A can distribute the display content displayed on the display unit 180 to the "Service C" (the workflow service) and request the "Service C" to review the display content.

FIG. 25 illustrates an example in which a user privilege for each of the "Service B" and the "Service C" is given to a login user managed by the contract user A in the user privilege information database 325. For example, in a case where the contract user A can use (i.e., has deployed) the "Service B" and the "Service C" but a user privilege for either the "Service B" or the "Service C" is not given to the login user managed by the contract user A, either the print button 2302 or the request review button 2304 will not be displayed on the display screen 2000 used by the login user.

(Procedure of User Authentication Processing Performed by Information Processing System 10)

FIG. 26 is a sequence diagram illustrating a procedure of the user authentication processing performed by the information processing system 10 according to an embodiment of the present invention.

First, the terminal apparatus such as the interactive whiteboard 100, the MFP 900, and the like receives an input of login information from the login user managed by the contract user (step S2401). For example, the login information includes the user ID and the password. The terminal apparatus transmits the received login information to the management server 300 via the communication network 12 (step S2402).

In the management server 300, the user authentication unit 340 obtains the login information transmitted from the terminal apparatus (step S2403), and performs the authentication processing of the login user on the basis of the login information and the user information database 324 provided by the management server 300 (step S2404).

Herein, in a case where the authentication processing of the login user has been successfully completed, the user authentication unit 340 transmits, to the terminal apparatus, the user authentication processing result indicating that the authentication processing of the login user has been successfully completed (step S2405). When the terminal apparatus receives the authentication processing result of the login user (step S2406), the terminal apparatus notifies, of the login user, that the login user has successfully logged in (step S2407). In this case, the management server 300 proceeds with the processing to step S2408.

Although not illustrated, in a case where the authentication processing of the login user has failed in step S2404, the user authentication unit 340 transmits, to the terminal apparatus, user authentication processing result indicating that the authentication processing of the login user has failed (step S2405). When the terminal apparatus receives the authentication processing result of the login user (step S2406), the terminal apparatus notifies, of the login user, that the login user has failed to log in (step S2407). In this case, the management server 300 ends the series of processing, without proceeding the processing to step S2408.

In step S2408, by referring to the deployment information database 321, the user-based linkage function control unit 341 of the management server 300 identifies a service 200 (i.e., a deployed service 200) that can be used by the contract user to whom the login user, who has successfully logged in, belongs.

Then, the user-based linkage function control unit 341 confirms the use-permission of the service 200 for the login user who has successfully logged in identified in step S2408 by referring to the user privilege information database 325 (step S2409).

In this case, in a case where the contract user to whom the login user belongs has deployed multiple services 200, the user authentication unit 340 confirms the use-permission for the login user for each of the multiple deployed services 200. For example, in a case where the user ID of the login user who has successfully logged in is "User 1", the contract user ID of the contract user to whom the login user belongs is "Company 1". Therefore, the user authentication unit 340 confirms whether the login user who has successfully logged in has use-permission for each of the "Service A", the "Service B", and the "Service C" deployed by the "Company 1" by referring to the user privilege information database 325. For example, according to the user privilege information database 325 illustrated in FIG. 10, the login user with the user ID "User 1" has use-permissions for all of the "Service A", the "Service B", and the "Service C".

Then, the user authentication unit 340 of the management server 300 transmits, to the service 200 deployed by the contract user to whom the login user belongs, the user authentication processing result indicating that the authentication processing of the login user has been successfully completed, the confirmation result of the use-permission of the service 200, and the user ID of the login user (step S2410). Herein, in a case where the contract user to whom the login user belongs has deployed multiple services 200, the user authentication unit 340 transmits, to each of the multiple services 200, the user authentication processing result and the confirmation result of the use-permission of the service. For example, in a case where the user ID of the login user is "User 1", the user authentication unit 340 transmits, to each of the "Service A", the "Service B", and the "Service C", the user authentication processing result and the confirmation result of the use-permission of the service.

When the service 200 receives the user authentication processing result and the confirmation result of the use-permission of the service (step S2411), the service 200 activates the use of the service 200 for the user ID included in the received user authentication processing result (i.e., the login user who has successfully logged in), in a case where the received confirmation result of the use-permission of the service indicates that the login user has the use-permission of the service 200 (step S2412).

Further, in a case where the received confirmation result of the use-permission of the service indicates that the use-permission for using the service 200 of the linkage destination is not given to the login user, the service 200 deactivates the use of the linkage function for linking with the service 200 of the linkage destination for the user ID (i.e., the user who has successfully logged in) included in the received user authentication processing result (step S2413).

For example, in a case where the user ID of the login user is "User 3", the service 200 is the "Service A", and the services of the linkage destinations are the "Service B" and the "Service C", then, the user with the user ID "User 3" has use-permission for the "Service C" but does not have use-permission for the "Service B" (see FIG. 10), and therefore, the service 200 (the "Service A") deactivates the use of the linkage function from the service 200 (the "Service A") to the service 200 ("Service B") by the login user (the "User 3").

Thereafter, when the terminal apparatus transmits a use request to the service 200 in response to an operation from the login user (step S2414), the service 200 determines whether the login user is permitted to use the service 200 on the basis of the user ID included in the use request in response to the use request transmitted from the terminal apparatus, and in a case where the service 200 determines that the login user is permitted to use the service 200, the service 200 provides its service to the terminal apparatus (step S2415). Accordingly, on the terminal apparatus, the login user can use the service 200 (step S2416).

For example, the service 200 may determine whether the login user is permitted to use the service 200 by querying the management server 300. Alternatively, the service 200 may store synchronization information synchronized with the deployment information database 321, and the service 200 may determine whether the login user is permitted to use the service 200 on the basis of the synchronization information.

FIG. 26 illustrates the case where the service 200 determines that "the login user is permitted to use the service 200", but in a case where the service 200 determines that "the login user is not permitted to use the service 200", the service 200 does not provide its service and instead notifies, of the terminal apparatus, a message that "the login user is not permitted to use the service 200".

The user authentication processing may be performed by the service 200 when the contract user uses the service 200 from the terminal apparatus. In this case, the service 200 may store synchronization information synchronized with the user information database 324, and may perform user authentication processing on the basis of the synchronization information.

The service 200 may store synchronization information synchronized with the user privilege information database 325, and may activate or deactivate the linkage function of the service 200 for each of the login users on the basis of the synchronization information.

As described above, the management server 300 according to the embodiment of the present invention includes: the linkage function activation unit 334 configured to, in a case where the contract user can use both of the service 200 of the linkage source and the service 200 of the linkage destination, activate the linkage function from the service 200 of the linkage source to the service 200 of the linkage destination; and the user-based linkage function control unit 341 configured to, in a case where the login user managed by the contract user does not have the use-permission for using the service 200 of the linkage destination, deactivate the use of the linkage function for the login user.

Therefore, in a case where the contract user does not have the use-permission for using the service 200 of the linkage destination even if the contract user is permitted to use both of the service 200 of the linkage source and the service 200 of the linkage destination under the contract, the management server 300 according to the embodiment can deactivate the linkage function from the service 200 of the linkage source to the service 200 of the linkage destination. Accordingly, the management server 300 according to the embodiment can prevent an occurrence of a problem such as an error that is displayed when the login user tries to use the service 200 of the linkage destination for which the login user does not have use-permission. Therefore, with the management server 300 according to the embodiment, when the login user uses a service, and there is another service that can be linked with the service used by the login user, the use of the linkage function to the another service for the login user can be appropriately controlled.

According to the embodiment explained above, in a case where a login user uses a service and there is another service that can be linked to that service, the use of a linkage function by the login user to the another service can be appropriately controlled.

Hereinabove, the preferred embodiment of the present invention has been explained in detail, but the present invention is not limited to the above embodiment, and can be modified or changed in various manners without departing from the scope of the claimed subject matter of the present invention.

The services, systems, and the like described above are merely an example of one of multiple computing environments for implementing the embodiment disclosed in this specification. In an embodiment, for example, the management server 300 may include multiple computing apparatuses configured as a server cluster. The multiple computing apparatuses are configured to communicate with one another via communication link of any given type including a network, a shared memory, and the like, and implement the processing disclosed in the present specification.

The "information processing apparatus" is not limited to the server as long as the "information processing apparatus" is an apparatus having the functions according to the embodiment explained above. For example, the "information processing apparatus" may be a projector (PJ), an interactive white board (also referred to as "IWB", which is a whiteboard with an electronic whiteboard function that allows interactive communication), an output apparatus such as a digital signage, a head-up display (HUD) apparatus, an industrial machinery, an imaging apparatus, a sound recording apparatus, medical equipment, a networked home appliance, a vehicle (more specifically, a connected car), a notebook-type personal computer (PC), a mobile phone, a smartphone, a tablet terminal, a game console, a personal digital assistant (PDA), a digital camera, a wearable PC, a desktop PC, and the like.

In the above embodiment, the "information processing system" is structured using a cloud system, but the "information processing system" may be structured using other systems structured on a communication network. For example, the "information processing system" may be structured using an on-premise system.

What is claimed is:

1. An information processing method, comprising:
   activating a linkage function from a first service of a linkage source to a second service of a linkage destination, in response to determining that both of the first service of the linkage source and the second service of the linkage destination are usable by a contract user;
   identifying a service, that is deployed by the contract user, based on information of the contract user associated with a login user who has successfully logged in;
   determining whether the login user has use-permission for using the service; and
   deactivating, in a case that the determining indicates that the login user has the use-permission for using the first service of the linkage source while not having use-permission for using the second service of the linkage destination, the linkage function which permits a use of the second service of the linkage destination from the first service of the linkage source for the login user.

2. The information processing method according to claim 1, wherein the deactivating comprises, in response to the determining indicating that the login user does not have the use-permission for using the second service of the linkage destination, causing the first service of the linkage source to deactivate the linkage function provided by the first service of the linkage source when the login user uses the first service of the linkage source.

3. The information processing method according to claim 2, wherein the deactivating further comprises, in response to the determining indicating that the login user does not have the use-permission for using the second service of the linkage destination, causing the first service of the linkage source to deactivate a graphical user interface (GUI) component of the linkage function provided by the first service of the linkage source when the login user uses the first service of the linkage source.

4. The information processing method according to claim 1, wherein the deactivating comprises determining whether the login user has the use-permission for using the second service of the linkage destination, based on user privilege information in which use-permission is set for each service for each of a plurality of login users.

5. The information processing method according to claim 1, further comprising causing the first service of the linkage source and the second service of the linkage destination to be usable in response to detecting deployment of the second service of the linkage destination by the contract user.

6. An information processing apparatus, comprising:
   processing circuitry configured to:
     activate a linkage function from a first service of a linkage source to a second service of a linkage destination, in response to a determination that both of the first service of the linkage source and the second service of the linkage destination are usable by a contract user;
     identify a service, that is deployed by the contract user, based on information of the contract user associated with a login user who has successfully logged in;
     determine whether the login user has use-permission for using the service; and
     deactivate, in a case that the processing circuitry determines that the login user has the use-permission for using the first service of the linkage source while not having use-permission for using the second service of the linkage destination, the linkage function which permits a use of the second service of the linkage destination from the first service of the linkage source for the login user.

7. An information processing system, comprising:
   a terminal apparatus;
   a plurality of services that are usable by the terminal apparatus; and
   an information processing apparatus including processing circuitry configured to:
     activate a linkage function from a first service of a linkage source of the plurality of services to a second service of a linkage destination of the plurality of services, in response to a determination that both of the first service of the linkage source and the second service of the linkage destination are usable by a contract user;
     identify a service, that is deployed by the contract user, based on information of the contract user associated with a login user who has successfully logged in
     determine whether the login user has use-permission for using the service; and
     deactivate, in a case that the processing circuitry determines that the login user has the use-permission for using the first service of the linkage source while not having use-permission for using the second service of the linkage destination, the linkage function which permits a use of the second service of the linkage destination from the first service of the linkage source for the login user.

8. A non-transitory computer-readable recording medium storing computer executable instructions which, when executed by processing circuitry of an information processing apparatus, cause the information processing apparatus to perform the information processing method of claim 1.

* * * * *